US012462285B2

(12) United States Patent
Swanson

(10) Patent No.: US 12,462,285 B2
(45) Date of Patent: *Nov. 4, 2025

(54) INTELLIGENT MULTIMEDIA E-CATALOG

(71) Applicant: eXalt Solutions, Inc., Cambridge, MA (US)

(72) Inventor: Leslie H. Swanson, Cambridge, MA (US)

(73) Assignee: EXALT SOLUTIONS, INC., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/768,317

(22) Filed: Jul. 10, 2024

(65) Prior Publication Data

US 2025/0014080 A1 Jan. 9, 2025

Related U.S. Application Data

(63) Continuation of application No. 18/348,501, filed on Jul. 7, 2023, now Pat. No. 12,067,602, which is a
(Continued)

(51) Int. Cl.
*G06Q 30/00* (2023.01)
*G06F 40/205* (2020.01)
(Continued)

(52) U.S. Cl.
CPC ....... *G06Q 30/0603* (2013.01); *G06F 40/205* (2020.01); *G06F 40/30* (2020.01);
(Continued)

(58) Field of Classification Search
CPC ..................... G06Q 30/0603; G06Q 30/0613; G06F 40/35; G06F 40/205; G06F 40/30; G06N 5/046
(Continued)

(56) References Cited

U.S. PATENT DOCUMENTS 5,307,261 A 4/1994 Maki et al.
5,550,971 A 8/1996 Brunner et al.
(Continued)

FOREIGN PATENT DOCUMENTS

CA 2284409 A1 3/2001
DE 19955717 A1 8/2000
(Continued)

OTHER PUBLICATIONS

Bhargava et al.: "Easy Contextual Intent Prediction and Slot Detection," IEEE, 5pgs, (Year: 2013).*
(Continued)

*Primary Examiner* — Robert M Pond
(74) *Attorney, Agent, or Firm* — Hamilton, Brook, Smith & Reynolds, P.C.

(57) ABSTRACT

An intelligent product catalog system provides for electronic creation, management and viewing of product information using a multimedia display system. A central database repository stores the product information and provides for an unlimited number of product attributes and dynamic reconfiguration of the product information. The central database repository comprises a metadata system, a scheme system and an object model system. A plurality of applications access the central database repository, the applications being automatically adaptive to the dynamic reconfiguration of the product information. A user interface provides display, sorting and filtering of the product information including the unlimited number of product attributes.

21 Claims, 26 Drawing Sheets

Related U.S. Application Data continuation of application No. 17/407,586, filed on Aug. 20, 2021, now Pat. No. 11,741,514, which is a continuation of application No. 16/212,390, filed on Dec. 6, 2018, now Pat. No. 11,127,057.

(60) Provisional application No. 62/596,568, filed on Dec. 8, 2017.

(51) Int. Cl.
  *G06F 40/30* (2020.01)
  *G06F 40/35* (2020.01)
  *G06N 5/046* (2023.01)
  *G06Q 30/0601* (2023.01)

(52) U.S. Cl.
  CPC ............. *G06F 40/35* (2020.01); *G06N 5/046* (2013.01); *G06Q 30/0613* (2013.01)

(58) Field of Classification Search
  USPC ...................................................... 705/26, 27
  See application file for complete search history.

(56) References Cited

U.S. PATENT DOCUMENTS

| | | | |
|---|---|---|---|
| 5,838,965 | A | 11/1998 | Kavanagh et al. |
| 6,035,283 | A | 3/2000 | Rofrano |
| 6,128,624 | A | 10/2000 | Papierniak et al. |
| 6,167,383 | A | 12/2000 | Henson |
| 6,513,112 | B1 | 1/2003 | Craig et al. |
| 6,615,166 | B1 | 9/2003 | Guheen et al. |
| 6,836,894 | B1 | 12/2004 | Hellerstein et al. |
| 6,892,185 | B1 | 5/2005 | Van et al. |
| 6,959,268 | B1 | 10/2005 | Myers et al. |
| 7,103,605 | B1 | 9/2006 | Hazi et al. |
| 7,299,202 | B2 | 11/2007 | Swanson |
| 7,315,830 | B1 | 1/2008 | Wirtz et al. |
| 7,546,232 | B2 | 6/2009 | Brooks et al. |
| 7,698,167 | B2 | 4/2010 | Batham et al. |
| 7,720,714 | B2 | 5/2010 | Edwards |
| 7,870,033 | B2 | 1/2011 | Swanson |
| 8,200,552 | B2 | 6/2012 | Swanson |
| 8,533,071 | B2 | 9/2013 | Swanson |
| 9,754,315 | B2 | 9/2017 | Swanson |
| 10,558,693 | B1 | 2/2020 | Elieson et al. |
| 10,672,047 | B2 | 6/2020 | Swanson |
| 11,127,057 | B2 * | 9/2021 | Swanson ................ G06N 3/006 |
| 11,741,514 | B2 | 8/2023 | Swanson |
| 12,067,602 | B2 | 8/2024 | Swanson |
| 2001/0051956 | A1 | 12/2001 | Bird |
| 2002/0032611 | A1 | 3/2002 | Khan |
| 2002/0046125 | A1 | 4/2002 | Speicher et al. |
| 2002/0054152 | A1 | 5/2002 | Palaniappan et al. |
| 2002/0107761 | A1 | 8/2002 | Kark et al. |
| 2002/0156695 | A1 | 10/2002 | Edwards |
| 2002/0156757 | A1 | 10/2002 | Brown |
| 2002/0169594 | A1 | 11/2002 | Yasuda et al. |
| 2002/0184111 | A1 | 12/2002 | Swanson |
| 2004/0030778 | A1 | 2/2004 | Kronenberg et al. |
| 2004/0205528 | A1 | 10/2004 | Vlad |
| 2008/0059343 | A1 | 3/2008 | Swanson |
| 2008/0126221 | A1 | 5/2008 | Swanson |
| 2010/0241503 | A1 | 9/2010 | Nakashima |
| 2012/0239522 | A1 | 9/2012 | Swanson |
| 2014/0222625 | A1 | 8/2014 | Swanson |
| 2015/0350444 | A1 | 12/2015 | Glass et al. |
| 2017/0242843 | A1 | 8/2017 | Jiao et al. |
| 2018/0108077 | A1 | 4/2018 | Swanson |
| 2018/0226066 | A1 | 8/2018 | Harris et al. |
| 2018/0308155 | A1 | 10/2018 | Kohli et al. |
| 2019/0164208 | A1 | 5/2019 | Dhoolia et al. |
| 2019/0180338 | A1 | 6/2019 | Swanson |
| 2022/0044292 | A1 | 2/2022 | Swanson |
| 2024/0005371 | A1 | 1/2024 | Leslie et al. |

FOREIGN PATENT DOCUMENTS

| | | |
|---|---|---|
| WO | 00/72452 A2 | 11/2000 |
| WO | 01/73656 A1 | 10/2001 |
| WO | 2002/063535 A2 | 8/2002 |

OTHER PUBLICATIONS

Bhargava et al.: "Easy Contextual Intent Prediction and Slot Detection," IEEE, 5pgs, (2013).

Corrected Notice of Allowance and Fee(s) Due, U.S. Appl. No. 15/688,119 dated Mar. 31, 2020, titled "Intelligent Multimedia E-Catalog".

Ec-Content, Inc. Launches Only Comprehensive Content Acquisition, Management and Maintenance Offerings for B2B Net Marketplaces, Business Wire May 2, 2000; 4 pages, extracted from Dialog on May 2, 2017 http.//dialog.proquest.com/professional/printviewfile?accountid=161862.

Non-Final Rejection Mailed on Jan. 19, 2024 for U.S. Appl. No. 18/348,501, 13 page(s).

Notice of Allowance and Fee(s) Due for U.S. Appl. No. 16/212,390 mailed May 25, 2021, titled "Intelligent Multimedia e-Catalog".

Notice of Allowance and Fee(s) Due, U.S. Appl. No. 15/688,119 dated Feb. 3, 2020, titled "Intelligent Multimedia E-Catalog".

Notice of Allowance and Fees Due (PTOL-85) Mailed on Apr. 17, 2024 for U.S. Appl. No. 18/348,501, 9 page (s).

Office Action Appendix Mailed on Apr. 17, 2024 for U.S. Appl. No. 18/348,501, 7 page(s).

Office Action for U.S. Appl. No. 16/212,390 mailed Aug. 18, 2020, titled "Intelligent Multimedia e-Catalog".

Scientific and Technical Information Center (STIC) Search Report EIC 3600, 54 pages (Mar. 23, 2012).

Srinivasan, V. and Chang, D. T., "Object persistence in object-oriented applications," vol. 36, No. 1, Application Development (1997).

\* cited by examiner

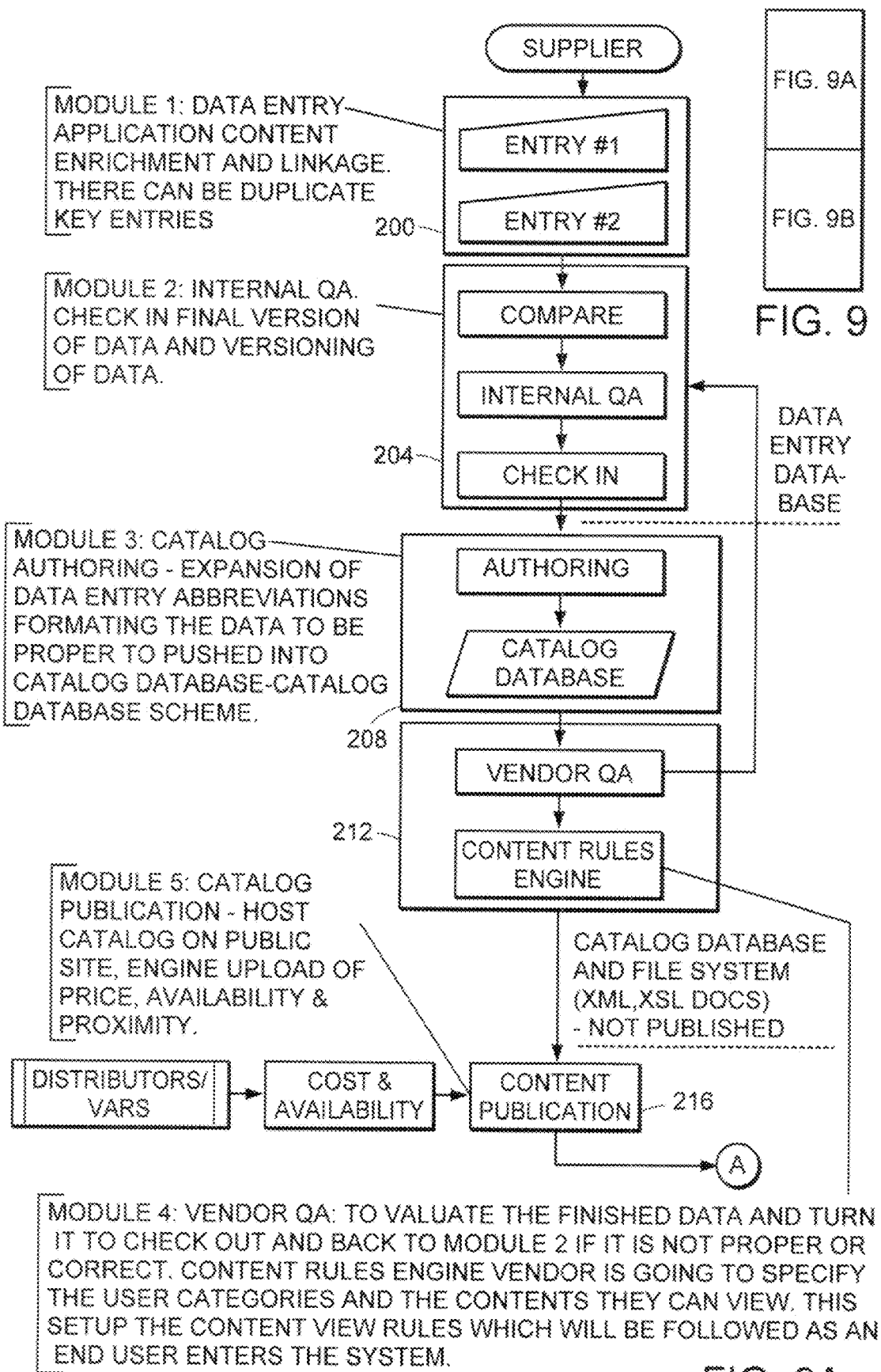

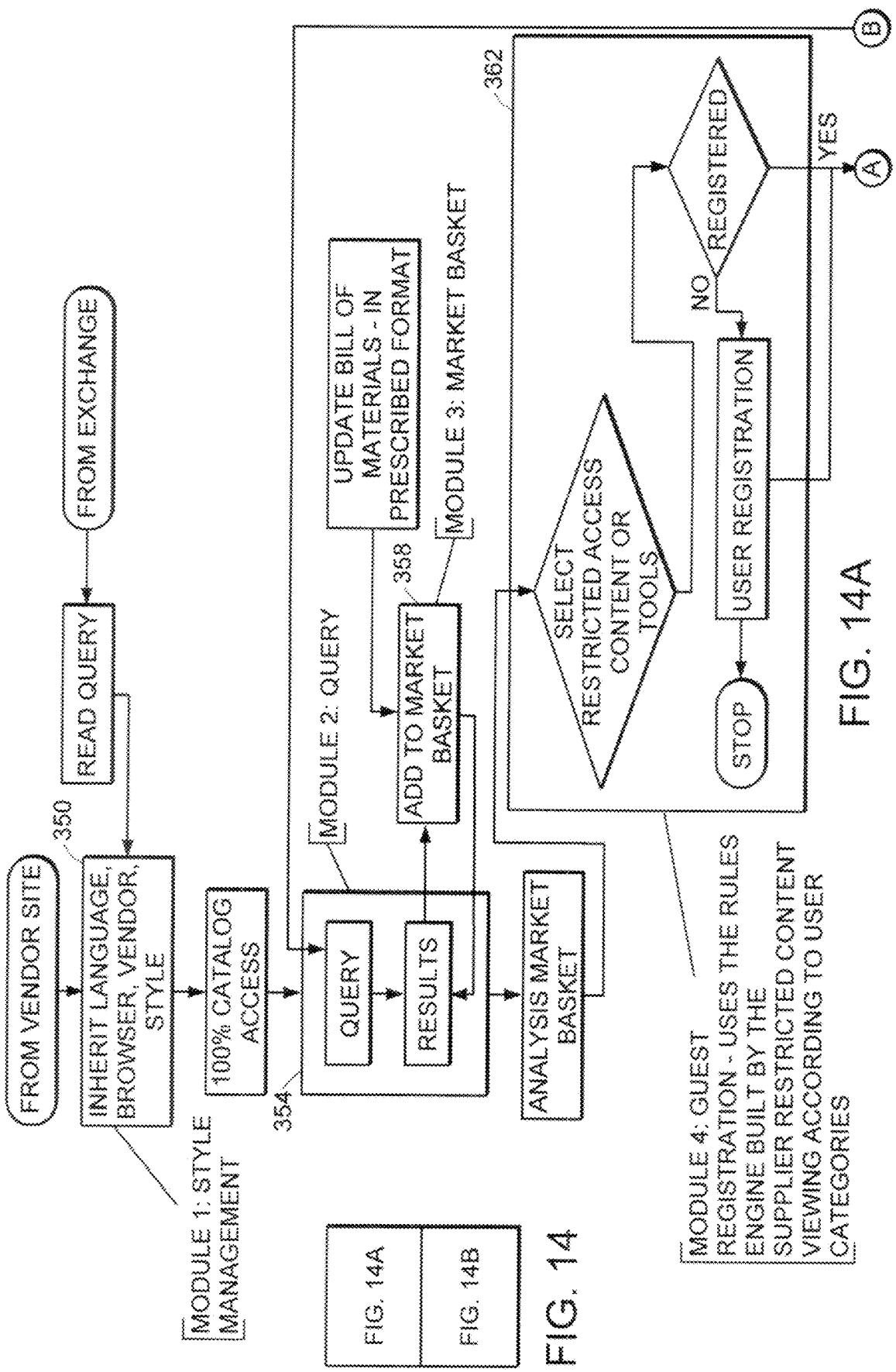

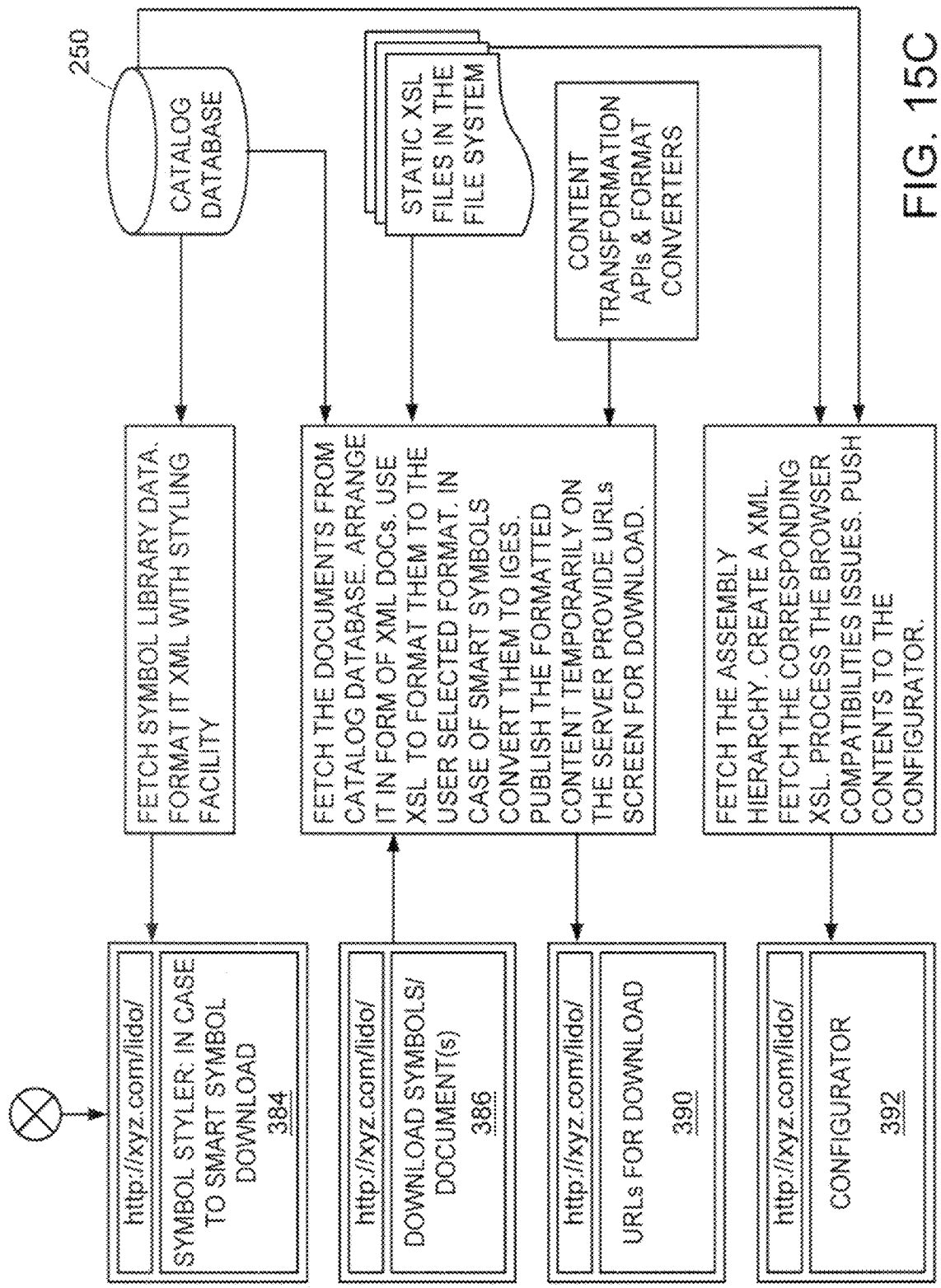

Example Interaction 1

| CHAT BOT | CUSTOMER |
|---|---|
| HELLO | I want to purchase a server |
| What application do you want to run | Oracle Database |
| This is a Storage Intensive Application. How many virtual CPU's do you think you will require (8, 16 or 32) | 32 |
| Because you selected 32 there are only 2 memory choices: (8GB, 16GB) which do you prefer? | 16GB |
| Only Vendor A and Vendor B make this solution. Do you have a preference? | No |
| Here is a link that details your recommended solution Click Here | |

Example Interaction 2

| CHAT BOT | CUSTOMER |
|---|---|
| HELLO | I want to purchase a server |
| What application do you want to run | 3D Rendering |
| This is a Processor Intensive Application. How many virtual CPU's do you think you will require (2, 4, 8, 16 32, 64, or 128) | 128 |
| Because you selected 3D and 128 there are only 3 memory choices: (16GB, 32GB and 64GB) which do you prefer? | 16GB |
| Only Vendor B, Vendor C and Vendor D make this solution. Do you have a preference? | Yes Vendor D |
| Here is a link that details your recommended solution Click Here | |

FIG. 16E

INTELLIGENT MULTIMEDIA E-CATALOG

RELATED APPLICATIONS

This application is a continuation of U.S. application Ser. No. 18/348,501, filed on Jul. 7, 2023, which is a continuation of U.S. application Ser. No. 17/407,586, filed Aug. 20, 2021, now U.S. Pat. No. 11,741,514, issued Aug. 29, 2023 which is a continuation of U.S. application Ser. No. 16/212,390, filed Dec. 6, 2018, now U.S. Pat. No. 11,127,057, issued Sep. 21, 2021 which claims the benefit of U.S. Provisional Application No. 62/596,568, filed on Dec. 8, 2017. The entire teachings of the above applications are incorporated herein by reference.

BACKGROUND OF THE INVENTION eCommerce is a tsunami ready to hit every major supplier. Gartner estimates that eCommerce will grow from a $500 million market in 1999 to a $7.3 trillion market by 2004. Goldman Sachs estimates that computers and networking will be the second largest eCommerce market segment comprising 15% of the B2B Internet economy. This fundamental technology shift is revolutionizing the way companies sell, market and support their products. The consequence of failing to meet this second wave of Internet technology could mean extinction for many suppliers.

To be eCommerce-ready starts with building an intelligent content and information architecture for supplier's product information—an Internet-ready and transaction-ready intelligent multimedia product catalog. Today most companies have deployed simple catalogs on their Web sites in graphical form incorporating HTML and PDF formats. Although these catalogs have provided unprecedented viewing access they have one major drawback—they can only be interpreted by people and not computers. Computer accessible intelligent product catalogs are the fuel of eCommerce, without them products can't be selected, transactions can't be completed, B2B exchanges are stalled and distributors and VARs are unable to book business over the Internet.

Intelligent content is key to keeping channels and marketing partners efficient. Currently, suppliers who have taken the initiative in eCommerce are finding that they have to push content to many thousands of Web sites a day. If suppliers are not ready for online eCommerce they could be locked out of doing business with major corporations and limiting their reach with distribution channels. Suppliers who don't take control of their product catalogs will risk their brand identity in the eCommerce marketplace. Vendors who don't take the initiative to create catalogs in electronic form are finding that distributors, exchanges and portals are creating their product content for them. This can result in the vendor's products being reduced to an undifferentiated commodity. Additionally, distributors may have biases, causing supplier products to be de-emphasized against competitors. Any errors or inaccuracies penalize suppliers with unnecessary lost sales or product returns. Suppliers who take an initiative will have strong control over their brand and enhance their market position.

Although the impact of these technology shifts is affecting all suppliers, network infrastructure suppliers have unique product characteristics and distribution channels that require custom strategies and solutions. The catalog content, architecture and design must support significantly greater product information and depth. Without detailed product documentation such as engineering drawings, installation specifications, CAD Symbols and other data suppliers risk a reduced ability to be "designed-in" to network infrastructure projects. The workflow involved in designing products requires reference to technical specifications, drawings and CAD information. Without this information products cannot be incorporated in a Request For Proposal (RFP), or recommended for purchase. Procurement organizations often must procure based on a drawing for these products and not a specific Stockkeeping Unit (SKU). Network infrastructure products are installed in mission critical networks that cannot afford to experience any downtime. Service and maintenance on these components is critical. Documentation of all products must be available for years after their purchase. Any vendor who overlooks this requirement is making their product difficult to maintain and expensive in terms of total cost of ownership.

Electronic product catalogs have become a prerequisite for capturing and maintaining strategic relationships between major corporations. Ninety percent of the procurement organizations of Fortune 1000 have electronic purchasing/exchange projects in progress or planning. The return on investment (ROI) for these companies is compelling. It costs large companies approximately $80-$200 per paper purchase order (PO). With electronic purchasing through an exchange this is reduced to about $8-$10. An electronic exchange can also prevent "rogue purchases" and help a company realize significant discounts as a result of larger volume purchases per approved vendor. An electronic catalog is the prerequisite for all eCommerce transactions today and tomorrow. Although end users/exchanges/distributors are entering product content on their own without the assistance of suppliers, any vendor who can offer their product content in a useful form and capture the critical approved vendor list (AVL) slots will take business away from their competitors. As the number of suppliers is reduced, revenue from existing accounts will be increased. Finally, a large barrier to entry will be established as it will be difficult for competitors to unseat an existing approved vendor. Network infrastructure product companies have some unique business requirements. Their products have long life cycles after initial selection and procurement. Network infrastructure products are technically complex, with extensive issues with respect to configuration, software releases and compatibility. Total cost of ownership of network infrastructure products often exceeds initial procurement cost due to being components of mission critical networks where any downtime experienced with the product can result in millions of dollars or loss, and networks infrastructures have extensive maintenance, monitoring and repair organizations to keep their eCommerce and internal operations running.

If vendors address the total cost of ownership associated with their products then their value proposition to the end user will be greatly enhanced. Complex sales processes affect the ability to be "designed-in" to network infrastructure projects. The workflow involved in designing and maintaining network infrastructure products during the "cradle to grave" life cycle is complex, involves many manual steps and many external companies/organizations. The sales process involves indirect channels for distribution and many professional services organizations which recommend, design-in, install and service the products. The procurement process for complex products often requires references to technical specifications and drawings to execute a purchase transaction. If vendors address the process associated with selling and influencing the recommendation of their products then their value proposition to the value added resellers (VARs), distributors, partners and influencers in the sales cycle will be greatly increased.

SUMMARY OF THE INVENTION

Companies are discovering that the existing catalogs on their web site are obsolete and insufficient for eCommerce. While existing catalogs will support human viewing they are not structure to assist software programs in completing transactions.

Intelligent multimedia electronic catalogs allow a supplier's product to be designed into complex network infrastructure projects while providing effective and efficient control of the supplier's content. Intelligent multimedia electronic catalogs incorporate intelligence by structuring product data to support electronic search and export. The data must be standardized and cross referenced. The catalog must be flexible enough to handle unlimited attributes, product categories and data types. A publishing engine controlling the representation and distribution of product content is key to preserving a supplier's brand in this new era of eCommerce. This enables partners access to content while preserving brand identity by using tools that both push content to partners and pull viewers back to the supplier. Supporting the number of different viewing audiences for product information requires an architecture and structures designed into the catalog to satisfy all of the combinations and permutations of languages, file formats, browser types that must access the catalog.

In one preferred embodiment an intelligent multimedia electronic catalog (e-catalog or third generation catalog) for network infrastructure products is provided. The complexity of network infrastructure products, workflow, distribution, procurement and life cycle maintenance requires more documentation and tools than conventional maintenance, repair and operation (MRO) catalogs. Network infrastructure products have numerous technical documents which must be available during the design, procurement, installation, test and maintenance cycle. Network infrastructure products also require configuration information for design and procurement. Tools must be built into the electronic catalog to assist in this process. Technical specifications differ between products, thus requiring comparison tools for price/performance analysis. Technical information regarding these products must be developed by experts with industry specific domain knowledge. Network infrastructure products have unique use models due to the numerous organizations involved in their life cycle and the associated complex workflow. Electronic catalogs must provide for rapid development times as eCommerce requires fast reactions to changing market conditions.

The present invention provides an intelligent product catalog system for electronic creation, management and viewing of product information using a multimedia display system. A central database repository for storing the product information provides for an unlimited number of product attributes and dynamic reconfiguration of the product information. The central database repository comprises a metadata system, a scheme system and an object model system. A plurality of applications access the central database repository, the applications being automatically adaptive to the dynamic reconfiguration of the product information. A user interface provides display, sorting and filtering of the product information including the unlimited number of product attributes. Specific products, comprising components, are selected based upon the product information, the selected products compose a system. The display of product and system data is dynamically re-rendered to reflect added product options. The scheme system provides configuration rules for configuring products based on the product information. The configuration rules provide for presenting only valid configurations of product options for the products. The configuration rules provide budget based configuration analysis such only the addition of product options that are within a predefined limit are presented. The budget is based upon at least one of: dimensions, weight, temperature, power consumption, air flow and cost. The configuration rules provide for presenting completed product bill of materials information prior to the bill of materials information entering an order entry system. The configuration rules provide for presenting only options that do not conflict with other options already selected for the product. A reporting engine tracks and records activity of actual product selection criteria used during a user session. A syndication and publication system provides for exporting of custom formatted product information. Exporting can be done periodically and at predefined intervals. The display includes an intelligent bill of materials displaying selected products and selected options for displaying products associated with a system, the display providing drill down for detailed information on the product. One preferred embodiment of the present invention provides a system for the creation of an intelligent multimedia e-catalog for network infrastructure products.

Electronic catalogs of the prior art offer limited graphics and descriptions with some linking (e.g., HTML Web pages). Some catalogs are implemented using simple products and offer more advanced static graphics (e.g., GIF), description and a limited database for parts. In contrast, the present invention provides dynamic graphics, unlimited attributes for describing product information (including the ability to define hierarchies of product descriptions), configuration rules, consistent object models and an intelligent bill of materials decomposition process.

Embodiments are directed to a computer-implemented conversation-based customer support system. The system includes a conversation engine (chatbot) coupled to a conversation interface. The conversation engine (chatbot) comprising: a conversation builder for building and processing conversations with a user based on intent. The conversation engine (chatbot) also comprising a compute service for performing actions in response to the processed conversations. The system further includes an intelligent product catalog system (e.g., Knowledge Work as a Service Platform) comprising configuration rules that determine valid configurations of product catalog options for product solutions. The intelligent product catalog system automatically publishes at the conversation builder different sets of questions associated with the product catalog options. Each set of published questions associated with a different intent. The intelligent product catalog system also configures the compute service with an interface to the intelligent product catalog system. In some embodiments, the configured interface from the compute service to the intelligent product catalog system is an application programming interface (API).

The conversation builder receives interaction from a user choosing a product solution. Based on matching the user interactions with a published intent, the conversation builder selects and sends a published series of questions in series to the user. For each sent question, the compute service forwards the question to the intelligent product catalog system to dynamically reconfigure product catalog options related to the question. The options are dynamically determined without any custom reprogramming of code at the compute service or intelligent product catalog system. The compute service presents to the user, the question and remaining product catalog options as option values for answering the question. For each answer by the user in response to the sent question, the compute service forwards the answer to the intelligent product catalog system to dynamically reconfigure product catalog options related to the sent question. In some embodiments, if remaining product catalog options only include 1 option, the compute service communicates to the conversation builder to send a next published question of the series rather than presenting to the user.

In some embodiments, the conversation builder executes natural language processing to parse and match synonyms to determine non-custom values associated with a question, instead of forwarding the question to the intelligent product catalog system. In some embodiments, the intelligent product catalog system automatically publishes a static list of values for at least one of the questions, and the conversation builder sends the static list to the user with the question, instead of forwarding the question to the intelligent product catalog system. In example embodiments, the conversation-based customer support system also includes a web application, such that the web application and conversation engine sharing a user identifier to enable the intelligent product catalog system to provide the product catalog options to the user in both the web application and conversation engine experience. In some embodiments, the intelligent product catalog system uses the user identifier to dynamically reconfigure the product catalog options personalized to the user. The conversation-based customer support system of claim 1 may maintains context throughout the conversation with the user.

In some embodiments, the configuration rules provide for presenting only valid configurations of product option for the product solution. In some embodiments, the configuration rules provide a budget based configuration analysis such that only the addition of product options that are within a predefined limit are presented or permitted. The budget may be based upon at least one of: dimensions, weight, temperature, power consumption, air flow and cost. In some embodiments, the configuration rules provide for presenting or permitting only options that do not conflict with other options already selected for the multivendor product solution.

In example embodiments, the conversation-based customer support system also includes a syndication and publishing system configured to syndicate at least a portion of the product options from a first catalog with at least a portion of the product options from a second catalog to create syndicated catalogs defined according to the parametric database schema. In example embodiments, the conversation-based customer support system further includes a content translator in communication with the syndication and publishing system, the content translator configured to convert unstructured content from the first and second catalogs into structured content using the parametric database schema to create at least a portion of the product options of the syndicated catalogs.

In some embodiments, the conversation-based customer support system also includes a database repository storing product information according to an object model representing the product information. The object model including parametric objects, graphic objects, document objects, configuration business rules objects and procurement rule objects. The database uses a metadata system describing the product information, the metadata system dynamically reconfiguring user applications when new product types are added to the database. In some embodiments, new configuration rules are added without reprogramming the object model.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 14 is a flowchart that includes FIGS. 14A and 14B showing the query engine, style management, market basket guest registration and customization modules that compose access and viewing functionality configured according to an embodiment of the present invention.

FIGS. 14A and 14B are a flowchart of the query engine, style management, market basket guest registration and customization modules that compose access and viewing functionality configured according to an embodiment of the present invention.

FIGS. 15A, 15B and 15C are flowcharts of the query engine, style management, market basket guest registration and customization modules that compose access and viewing functionality configured according to an embodiment of the present invention.

FIGS. 16A-16E illustrate using the intelligent multimedia e-catalog to provide conversational-based customer support in embodiments of the present invention.

DETAILED DESCRIPTION OF THE INVENTION

Figure 1:
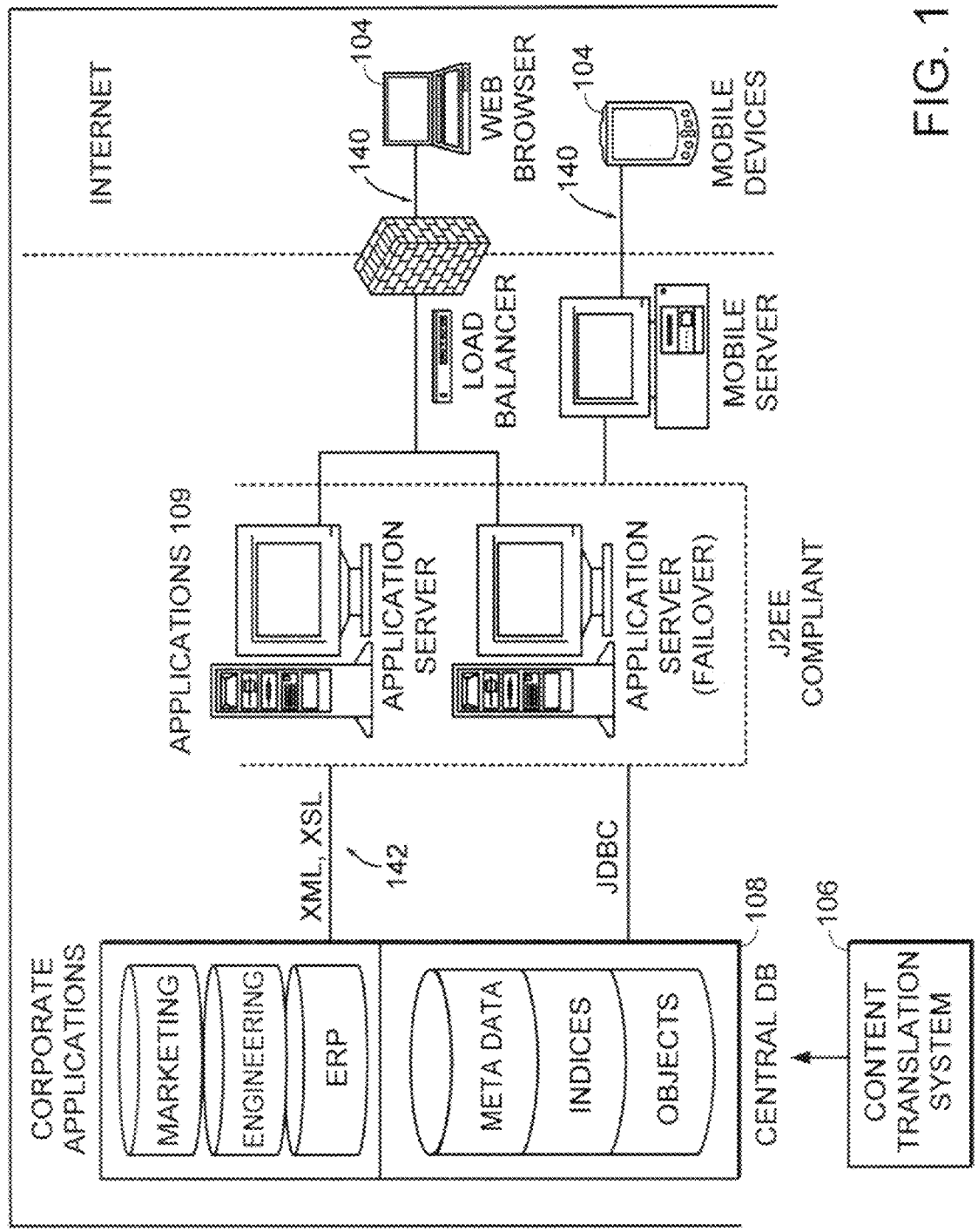
FIG. 1 is an illustration of an overall architecture for implementing an embodiment of the present invention.

A description of preferred embodiments of the invention follows. To satisfy the business requirements of eCommerce and specifically the network infrastructure products market, the following critical technical features must be present in an intelligent multimedia e-catalog:

| Business Requirement (Problem) | Technical Feature (Solution) |
| --- | --- |
| Electronic multimedia catalogs have become the prerequisite for capturing and maintaining strategic relationships with the Global 2000 companies. | Intelligent multimedia e-catalogs go beyond eBusiness to enable eCommerce with Global 2000 companies. Until now suppliers have been able to deliver second generation product catalogs which can facilitate eBusiness but not eCommerce. eBusiness is best characterized by publishing corporate and product content over the Web (e.g. "brochureware") for human viewing. ECommerce is enabling transactions over the Web so that content is intelligently structured for access by the procurement exchanges. |
| Vendors lacking intelligent e-catalogs are being reduced to a commodity. | Intelligent e-catalogs with a breadth of attributes strongly differentiate products in an eCommerce marketplace. The catalog must go beyond the classic catalog content of a description of elements and procurement information (e.g., price, availability, proximity) and provide detailed parametric and technical data for each product. By offering this breadth of attributes suppliers will be able to fully differentiate their products. |
| Brand identity is being compromised by unauthorized content creation and publication. | Intelligent e-catalogs enable vendors to become the only authorized publisher of their content by: capturing the complexity of the product positioning, product family and configuration information, protecting identity with superior quality assurance using rigorous QA procedures during the content development cycle, managing distribution of content in a timely manner to thousands of sites. |
| Exchanges and other one-stop distributor portals are disabling cooperative marketing. | Two-way linking of data is required, pulling traffic back to the supplier's Web. Ideally every place that content is distributed to will be a lead generation vehicle for pulling viewers back to the supplier. Punchout links and other intelligent hooks should be embedded into the content and pull end users back to the supplier/vendor site. |
| Lack of intelligent product catalogs will cause a loss of business with an exponentially growing viewing audience. | Intelligent multimedia e-catalogs have functionality Intelligence designed in to accommodate translation/transformation to the languages, browser formats and interchange formats of all market segments for support of a worldwide audience utilizing a variety of access technologies the catalog must support. Internationalization is achieved by supplying content in a variety of languages and supporting regionalization issues such as currency and units of measure. Content is distributed easily from the intelligent e-catalog in a variety of traditional formats such as print, CDROM, HTML. In addition, all major Web browsers are supported, including new technologies such as wireless. |
| After market considerations must take into account products with long life cycles, high technical complexity and high cost of ownership. | An intelligent multimedia e-catalog must provide all product information required during the entire product life cycle. The e-catalog must be the central repository for all of the product documentation needed to design and maintain the product. This includes technical specifications, CAD symbols, installation notes, data sheets, product configuration information and product substitution information. |
| Complex sales process affects ability to be "designed-in" | Specialized tools are built into the catalog to ensure that supplier's products are being "designed-in" during the sales/procurement cycle. These include configuration checking, add on sales analysis tool and up selling analysis tools to increase the probability that the supplier/vendor products will be designed-in. Additionally, tools to help design engineers are provided, including CAD ready symbols and detailed illustrated catalog descriptions to help engineers design-in the supplier/vendor products. |
| Complex workflow, complex products with unique characteristics, and complex distribution cycles. | Intelligent multimedia e-catalog content must be developed by experts in the industry domain. These experts must understand network infrastructure products and be intimately knowledgeable of how they are used by design consultants, channel partners, end users, installers, integrators and other parties involved in designing and maintaining networks. |

The present invention provides a multimedia e-catalog having intelligence designed in, this allows for enriched content which is a foundation for its architecture. The exponentially growing demand for intelligent product data requires a strong IT management strategy that designs flexibility into the content so that it can be translated and integrated into numerous sites each with different requirements. Without care and consideration given to the design of the data it will become unmanageable due to the depth and breadth of information required. New technologies such as XML help manage this complexity by providing transformations of data into other languages or viewing formats (PDF, HTML, print-ready) on the fly. Some of the design requirements and critical technologies for an intelligent multimedia e-catalog are described below:

| Feature | Second Generation Catalog | Intelligent Multimedia e-catalog |
| --- | --- | --- |
| Native Markup Language | HTML | XML |
| Graphic Format | Binary Images Only: PDF, GIF, JPEG | Vector Graphics: SVG Binary Images Only: PDF, GIF, JPEG |
| Content Structure | Unstructured content. Product features and attributes are not stored in an intelligent database structure. | Well-structured content. Product features and attributes are stored in an intelligent database. |

| Feature | Second Generation Catalog | Intelligent Multimedia e-catalog |
|---|---|---|
| Content Reuse | PDF, GIF, JPEG formats which prevent ease of reuse of the content. Content is human readable only. | XML facilitates ease of reuse with simple copy and paste. Both text and graphics are fully searchable. |
| Content Query | Cannot perform queries on the content. | All content is accessible by queries. |
| Transformations/ Personalization | Difficult to implement | Numerous Transformations Designed In: Personalization by company, user type Internationalization personalization Accommodates different browser access on the fly (e.g. Wireless). |
| Catalog Architecture | Catalog is Locked Inside of other Applications: Exchanges, Portals | Standalone Catalog Server: Manage Catalog Content from one place. Seamless XML integration with other applications. |

All of the major technology leaders, including Sun Microsystems and Microsoft, have converted a majority of their products to be XML already. XML is seen as a key competitive advantage. Several venture capitalists see XML as such a major technology that they have formed specialized funds to back XML startups.

Unlike true commodities, technically complex products (e.g., network infrastructure components) require a broad set of attributes to properly describe and differentiate their capabilities. The breadth of product attributes required for network infrastructure products include: description, procurement attributes such as: price, availability, proximity, geometry attributes, technical performance attributes, reliability attributes, and hazard/safety attributes. It is critical that the e-catalog software and its user interface support this breadth of attributes during both query and display functionality in an easy to use interface.

Flexibility is required to create an unlimited number of product categories without custom programming. The e-catalog is designed with a unique scheme that can handle any kind of product definition. This is different from other catalogs that require custom programming to incorporate new products with different attributes.

The e-catalog illustrates catalog parts (components) utilizing intelligent vector graphics. Network infrastructure products are technically complex, often with many subassemblies and separately purchased options. It is not sufficient to show a simple photograph in JPEG format for users to make product decisions. The present invention provides a fully illustrated parts catalog showing all of the subassemblies for a product in an easy to read 3D engineering drawing.

The e-catalog has a flexible and scalable architecture with modular product design allowing for a phased implementation. The catalog has been designed to be modular, as a result you can implement your e-catalog solution in phases. Scalable architecture provides long term growth. Due to large audiences, the e-catalog has been designed to scale and provide performance regardless of load or depth and breadth of content. Many suppliers in the eCommerce space have offered attractive solutions only to obviate the benefits by making critical mistakes in the architecture design. This has rendered the products useless when large number of users attempt to access the product. More importantly, due to rapidly changing technology, they have missed important shifts such as XML which make development extremely efficient and facilitate unprecedented integration between companies.

The e-catalog leverages industry standards to insure ease of integration. The e-catalog leverages industry standards from the database layer to the user interface layer. Standards such as SQL are used at the relational database layer. XML is leveraged throughout the product to assure long term viability in eCommerce. For vector graphics, SVG the industry standard set by the W3C and is adopted by Adobe, Sun and Microsoft is used.

The present invention captures domain expertise which is key to deploying a useful product. In depth domain expertise in the network infrastructure industry includes development of a product catalog containing in-depth domain expertise for each product category. This is especially true of the industries that have very complex products (e.g., network infrastructure industries). Choosing a supplier that has in depth knowledge insures that the product quality and usefulness will be maintained. Learning curves and demands from internal staff are also minimized.

The present invention avoids mistakes made by companies developing online catalogs. Normalized content assures retrieval of all products and content, poorly developed content creates inconsistencies in normalizing descriptions and units of measure. When these inconsistencies creep into the data, available products are often hidden from the customer's view. A well-designed database scheme assures a rapid and complete search, designing the database is one of the most important parts e-catalog design. If the information model is poorly designed, users will experience poor response times and lack of usability. The information model must reflect all of the queries that a user could pose to the system. The model must also correctly represent the complex interrelationship between items, for example: what products are substitutes for each other, how users like to select products and how users find add-on products.

The present invention incorporates four critical capabilities necessary to produce an intelligent multimedia e-catalog. These are 1) a critical mass of applications, 2) affordable "one-stop-shopping service using an ASP model, 3) flexible and scalable architecture incorporating standards that assure long term growth, and 4) an ability to capture substantial domain expertise (e.g., networking infrastructure) into well designed and usable product. Conventional systems do not provide a total solution to the problems faced by complex product suppliers (e.g., network infrastructure suppliers). The present invention an intelligent multimedia e-catalog system capable of addressing the needs of complex product suppliers using a flexible and scalable architecture incorporating standards that assure long term growth.

FIG. 1 is an illustration of an overall architecture for implementing an embodiment of the present invention. In one preferred embodiment of the present invention four major architectural elements are defined: a content translation system 106, a central database repository 108, applications 109 and access 104. The content translation system 106 provides inputting, formatting, editing and converting documents into a format for storage in central database repository 108. Applications 109 run on an applications server to provided access 104 at various integration points (e.g., Web browser, mobile devices, other programmatic access). The combination of the defined elements provides for an intelligent multimedia e-catalog.

Content translation system 106 processes content for complex products (e.g., network infrastructure products) typically developed by industry "domain experts" who have intimate knowledgeable of how content is used by consultants, channel partners, end users, installers, integrators and other parties involved in designing and maintaining networks. The present invention transforms the suppliers' content from paper, PDF, CAD drawings, and the like into intelligently structured content. The foundation of the present invention is structured content in XML format. The present invention uses XML to solve the major problems associated with conventional HTML based catalogs, which can only be interpreted by people and not computers. Utilizing these technologies, the present invention elevates the product content of suppliers' catalogs from brochureware viewable by people, to transaction ready catalogs for eCommerce computer applications.

Central database repository 108 unlocks the islands of product information inside a supplier's business and provides a central repository of up-to-date product information that is Web accessible and transaction ready for computer use. The central database repository 108 stores items (e.g., parts/components) using a consistent object model for each item. Indices are maintained to improve access and update performance. Metadata is also stores, including product rules, business rules, historical information rules and system configuration rules.

Applications 109 provide capabilities to access central database repository 108 to select components, configure products, collaborate on design, order components, provide support and manage administration of the applications. The applications 109 replace the paper, phone and fax based communication that currently clog the collaborative sales and procurement process. A user administration application provides account management and access control. A scheme application provides schema maintenance, including the addition, deletion and updating of attributes.

Access 104 enable instant access in to applications 109 and the central database repository 108 in any format. The stored content is developed using XML and can be dynamically changed into a variety of formats necessary for eCommerce transactions, data interchange and browser access including wireless.

The open systems architecture of the present invention adheres to industry standards providing for an open systems architecture not prone to obsolescence. The present invention is built to integrate best of breed applications servers through J2EE industry standards. Instead of reinventing the wheel like older Internet based products, the present invention's architecture allows for constantly improving applications 109. As the applications server market changes users of the present invention are free to change with it. The central database repository 108 is built around relational database. Database calls are JDBC compliant allowing the applications 109 to switch databases as needed. No database specific stored procedures or other utilities are required for an implementation of the present invention.

The applications architecture provides for scalability and performance of the applications 109 over the Internet. In one preferred embodiment the applications 109 are built using a thin client model. All applications 109 can be built to be browser accessible. Suppliers and their partners do not require any special applications software on their computer or any extensive training on a new user interface in order to access applications 109. The applications 109 are built to change as business rules and processes change. The applications architecture provides for rapid change as the business rules are separate from the application code. The present invention therefore provides for rapid deployment, as no programming is required to make configuration rule, personalization or user security rule modifications. In one preferred embodiment Java-based applications 109 assure reliability, scalability and performance over the Internet. Java also assures an open application design and compatibility with leading hardware and operating systems.

The present invention emphasizes two dynamics of information flow: pushing 140 vendor product messaging out to market (e.g., push publication of data) and pulling 142 of information into the applications 109 (e.g., pull of price, availability information).

The catalog insures that all potential target audiences are reached by the supplier. The supplier now controls the product positioning and messaging with using a breadth of attributes. The vendor differentiation is protected by pushing very broad attribute data to the end user purchasing portals, marketplace exchanges and distributor catalogs. Using subscription agreements and a publishing engine the vendor enforces the freshness and accuracy of data by signing up subscription agreements. These agreements allow custom translation interfaces to be developed for each target portal. Distributors and exchanges are no longer developing content for the supplier.

In all aspects the catalog pulls end users, partners and channel partners back to the vendor's Web site for complete information. Unparalleled technical documentation, product documentation, unique analysis tools and customer relationship management capabilities make the site a rich resource for any end user, distributor, or partner. Specialized hyperlinks are embedded in target portals allowing users to quickly "punch out" to the suppliers site for more in-depth information. This protects the vendor's brand and enhances the relationship with the end user. By retrieving price, availability and proximity data from distribution partners automated routines allow procurement information to be retrieved from the supplier's distributors and VARs. This allows the end user, consultant or integrator to have a one-stop shopping portal for the supplier's products.

Figure 2:
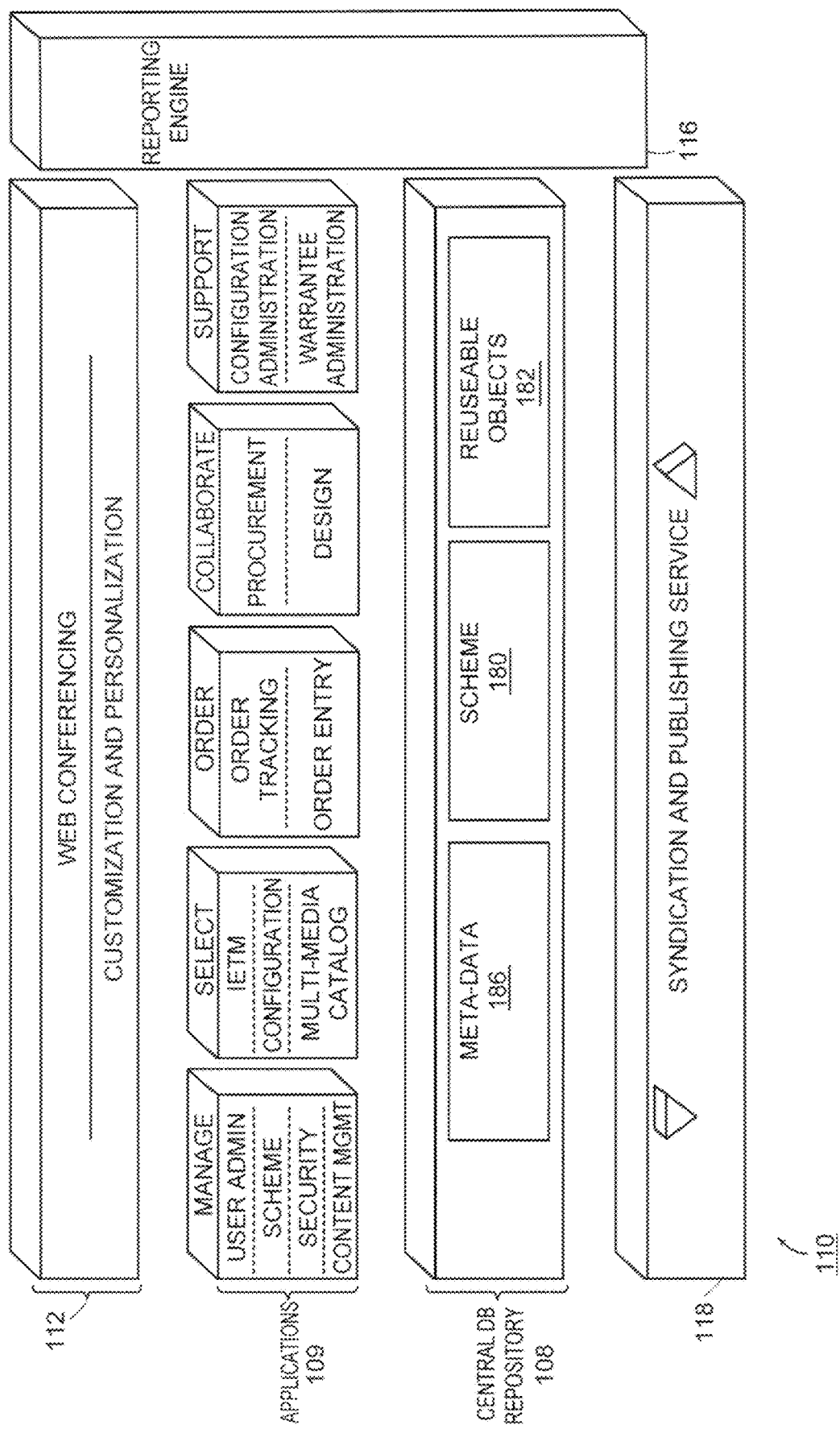
FIG. 2 is an illustration of components as configured in a preferred embodiment of the present invention.

FIG. 2 is an illustration of components as configured in a preferred embodiment of the present invention. The e-catalog 110 is comprised of a central database repository 108, applications 109, a syndication and publishing service 118, reporting engine 116. An interface for Web conferencing and customization/personalization 112 is also provided.

Central database repository 108 stores information for e-catalog 110 and includes metadata 186 used to describe the data, scheme 180 used to define entities and relationships inherent in the data and reusable objects 182 used to represent the data.

Applications 109 include Manage, Select, Order, Collaborate and Support. The Manage application provides user administration functionality which allows suppliers to create and manage user accounts and profiles. Security allows suppliers to secure their environment by assigning users permissions and controls for applications and views. Scheme allows changes to the attributes and objects to be displayed for products. Content Management allows suppliers to add, modify or delete content to the product repository. The Select application provides a guided sales experience for end users, sales representatives and channel partners by providing an intelligent multimedia catalog over the Web. The Select application is designed to accommodate complex products that may have hundreds of attributes, dozens of documents, complex illustrations and configuration rules. The product centralizes all product information required in the sales process in a single repository. This allows suppliers to realize higher sales productivity, drive revenues and take market share from competitors by providing correct, up-to-date and easy to understand information on complex products to all of its partners. Select also provides for creating interactive electronic technical manuals (IETM). The Order application allows orders to be built correctly the first time, eliminating manual checking and dramatically reducing the supplier transaction processing costs per order. Customer satisfaction is improved due to clarity in the order building process. Distribution partners determine product availability, order confirmation, pricing confirmation and shipment status over the Web thus eliminating up to 40% of phone queries back to customer service representatives. The Collaborate application supports both procurement and design collaboration that occurs among the myriad of partners for a supplier. Online procurement collaboration replaces the manual process of assembling paper Requests For Proposal (RFP) and bid specifications. The Support application provides warrantee administration, point of sale analysis, and configuration management.

The reporting engine 116 tracks user selection criteria and track types of technologies employed. Typical activity-based access reporting can detect what attributes are being accesses most frequently, but the present invention provides user-based access of specific attributes by detecting that certain users are selecting products using certain attributes (e.g., by color first, then by dimensions). This information can then be used by suppliers to optimize the presentation of their products. The reporting engine 116 provides management the ability to gain early insight into buying trends. Unlike conventional reporting which provides information about users, the present invention provides information about user activity. The most popular products and options can be identified before purchase or shipment. Management can now see what features customers are using to select products.

The syndication and publishing service 118 provides customized content presentation for syndication and publishing applications. The central database repository 108 foundation facilitates ease of data mapping between the e-catalog 110 and outside data management systems. The data mapping enables suppliers to export catalog content to the myriad of distribution channels, VARs, private exchanges and partners who may require content to drive their portals, catalogs or e-procurement sites. The present invention manages the publication cycle using subscription agreements for sending data to, and retrieving data from, suppliers and their partners. The present invention creates the necessary transformation files to convert the excerpted product data into the desired file formats and standardized descriptions. Delivering data in a variety of formats, at different intervals, removes an enormous burden from marketing and IT staffs overwhelmed with requests.

Web conferencing and customization/personalization 112 provides the ability to interactively confer on design, procurement, support and other decisions. By allowing parties to view draft configurations and proposals online feedback and revision cycles are reduced. This allows for higher quality products to be design in less time, with fewer mistakes. Additionally, customization provides for defining an unlimited number of views of data stored in the central database repository 108. Among the various views, some views can be country specific (e.g., filtering out products inappropriate for specific countries). Other views can be user specific, filtering based on user preferences (e.g., preferences for a specific supplier). By saving the definition of the customized views a personalized view can be build and used later. This allows suppliers to create views over a catalog; dynamically presenting different content to different users based upon login information. User can be targeted with different products to enhance sales campaigns. Geographic markets can be restricted to access only products appropriate for their markets (e.g., electrical connectivity, import/export restrictions, other government regulations, etc.). Data can be transformed on the fly to accommodate internationalization, a variety of output formats (e.g., print, CDROM, HTML pages) and browser support (including wireless) allows companies to reach new markets easier. Views also allow users to personalize and customize their own interface.

Figure 3:
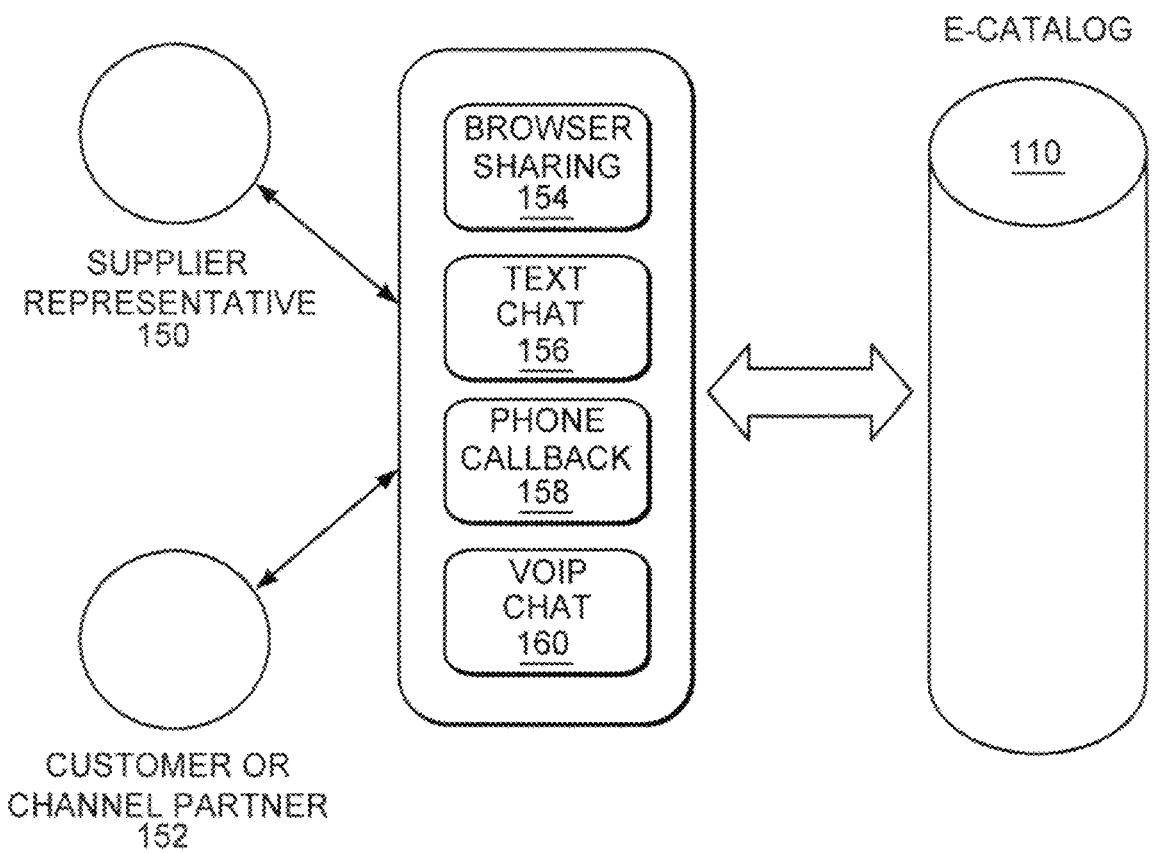
FIG. 3 is an illustration of various ways in which the present invention is used to provide Web-based customer support.

FIG. 3 is an illustration of various ways in which the present invention is used to provide Web-based customer support. A high percentage of users leave Web sites because of lack of human interaction. This hurts both the selling and support process. With browser-based support integrated into the present invention, the e-catalog becomes instrumental in the day to day selling and support process for both end users and channel partners. World-wide applications of the Web conferencing capability include: sales conferencing with customers and channel partners which give the same experience as an onsite visit; higher conversion of browsers into buyers; lower support costs and improved customer service; and lowers telecommunications expense. Customers and channel partners 152 can now be assisted during the product selection, configuration and design process live over the Web. Collaborative sessions can include filling out forms for product selection or highlighting product specification information in white papers or technical specifications. The present invention's analysis tools can be used online to show the advantages of upgrading or selecting add-on products. By offering a similar experience of being onsite working with customers over a catalog sales personnel do not have to travel to visit users or partners on site. Market research shows that a high percentage of browsers leave a Web site before buying. By offering an ability to directly contact a sales representative by clicking a button on the e-catalog you can make contact with customers quickly converting browsers into buyers. Customers with support questions can select products before contacting support thus reducing the time spent during the session acquiring customer and product information. Product questions are answered quickly since both users are able to view the product information together. Both users are able to make notations on the web page during the conference. Email, text chat and support call times lead to greatly reduce telecommunication expenses. In addition, by providing voice over IP (VoIP) based telephony these costs are further reduced.

Customer or channel partners 152, as well as suppliers 150 can interact with e-catalog 110 via various media options, including browser sharing 154, text chat 156, phone callback 158 and VoIP chat 160. The e-catalog 110 is thus used to provide Web-based customer support.

Figure 4:
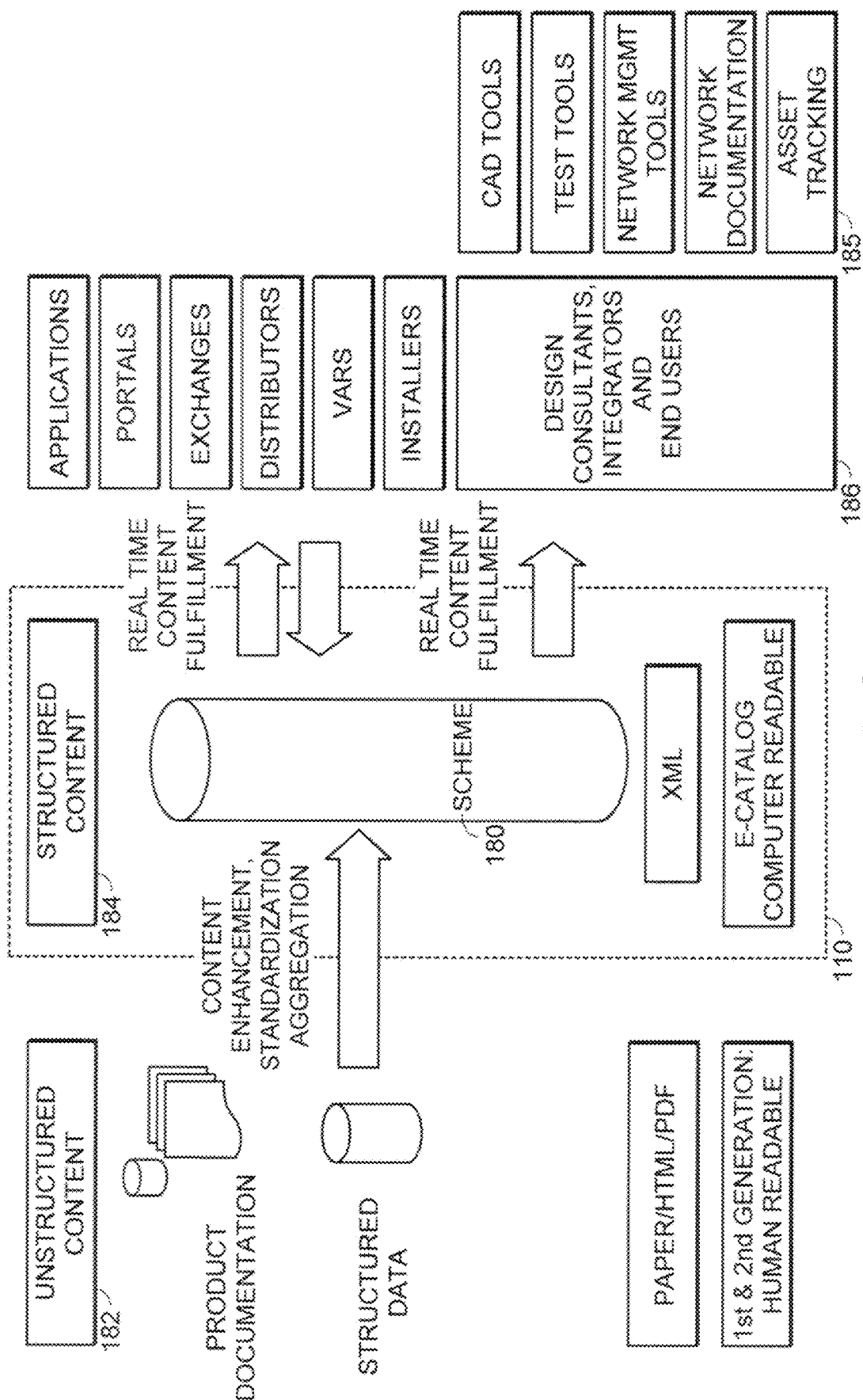
FIG. 4 an illustration of a Content Translation System configured as part of a preferred embodiment of the present invention.

FIG. 4 is an illustration of a Content Translation System configured as part of a preferred embodiment of the present invention. The Content Translation System converts unstructured content 182 in the form of paper-based and 1st and 2nd generation electronic documents into XML-based structured content 184 for the intelligent multimedia e-catalog 110 using scheme 108. The structured content 184 is then accessed by design consultants, integrators and end users 186. The design consultants, integrators and end users 186 can then use tools 185, such as CAD tools, test tools, network management tools, network documentation tools and asset tracking tools to interact with the structured data 184 from e-catalog 110.

Early innovators in eCommerce have found that they have to distribute their content to many as thousands of Web sites per day. Distributors, VARs, installers, partners, design consultants, integrators and outsourcers all require information, often on a daily basis. Unfortunately, each requires data in their own format which requires transforming subsets of the content on the fly into various company specific formats. The present invention manages the publication cycle by managing "Subscription Agreements" for an unlimited number of audiences. The subscription agreement details the required format and frequency of update for each subscriber. A dynamic data retrieval engine for pulling content from internal and partner systems, including bidirectional data update is fully facilitated by the present invention. Price, availability and proximity data can be retrieved from distribution partners and updated in the e-catalog. The present invention fully accommodates the numerous custom formats for retrieving information from suppliers. A "Retrieval Agreement" details the required format and frequency of retrieval from each subscriber.

Networking Products have a long life cycle after initial selection and procurement. There are a large number of documents that end users require for maintenance, monitoring and repair to keep internal operations up and running for years after the initial installation. To support procurement of replacement parts a fully interactive technical manual must be fully integrated with the e-catalog 110. Network infrastructure products have extensive documentation necessary during the entire life cycle which must be fully cross referenced in the catalog, including: data sheets, white papers, mechanical drawings, installation notes, specifications, photos and pinout schematics.

Specialized tools for network infrastructure partners, end users and channel partners are needed. Network infrastructure products are complex with many subassemblies and options. Users and channel partners both need assistance in configuring products. Suppliers face numerous product returns, up to 15%, due to incorrect configuration. The e-catalog 110 content and structure supports three types of configuration: a basic configurator; an "upsell" analyzer; and an "add on sell" analyzer. The basic configurator insures that the products being selected are compatible and that the configuration is correct. The "upsell" analyzer illustrates the cost and benefit of "upgrading" the users' product selection to a higher revenue/margin product line (e.g., users can see the price/performance tradeoffs of selecting 1000BT over 100BT or CAT 7 vs CAT 6). The "add on sell" analyzer analyzes a set of selected products for completeness and suggests compatible complementary products. This will suggest add on products for a configuration to the user or design consultant.

Due to the long life cycle of network infrastructure products, users require information on product discontinuance and substitution options. Often users need to inquire years after the initial purchase in a very mission critical network. Information must be delivered quickly and accurately. Simple photographs of products do not convey the detail required for determining substitutability.

CAD symbols and parametric information are keys to being "designed into" a network. Offering the complete tools necessary for implementation of a product is key. Delivery of CAD information by the vendor removes unnecessary time and iterations in the design process. Offering CAD symbols that can be customized on the fly for different CAD Packages supports all of the segments in the market. The content translation system 106 provides the functionality to achieve these benefits.

Figure 5:
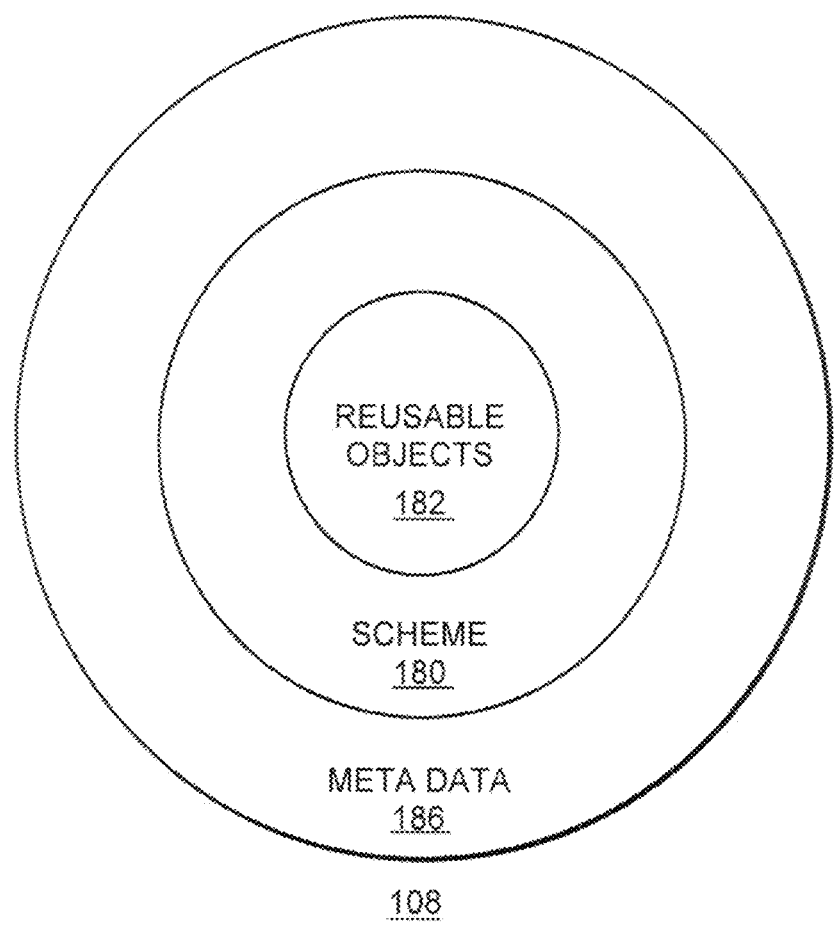
FIG. 5 is an illustration of the central database repository.

FIG. 5 is an illustration of the central database repository. Reusable objects 182 provide a consistent object model for representing product information. The content translation process 106 creates reusable objects of information for every product, so that data is entered once and transformed many times. This allows the present invention to minimize the amount of data that must be entered to just the essential elements. Ensuring that an element is entered only once guarantees data integrity and minimizes errors resulting from needless repetitive entry. The objects stored in the central database repository 108 comprise five different types: parametric objects 195, graphic objects 196, document objects 197, configuration business rule objects 198, and procurement rule objects 199. The content can be stored in a relational database or linked file system.

A scheme 180 defines the organization data for fast retrieval and data interchange by any combination of attributes. The scheme is specially designed to accommodate complex products, which are described by hundreds of attributes, dozens of documents, complex illustrations and esoteric configuration rules. The objects for each part/product are collected in one central repository built for scalability. As user access, content size and computer access grows, performance is maintained. The scheme 180 enables users to query by any combination of objects while providing faster retrieval performance than is offered by traditional SQL queries.

Metadata 186 eliminates the extensive programming required to customize most applications. Changes to the metadata 186 in the central database repository 108 drive changes to the software eliminating as much as $2 spent on customization for every $1 spent on the application. The information model of the central database repository 108 provides for the addition of unlimited product categories, attributes, configuration rules and multimedia content without any software reprogramming.

Figure 6:
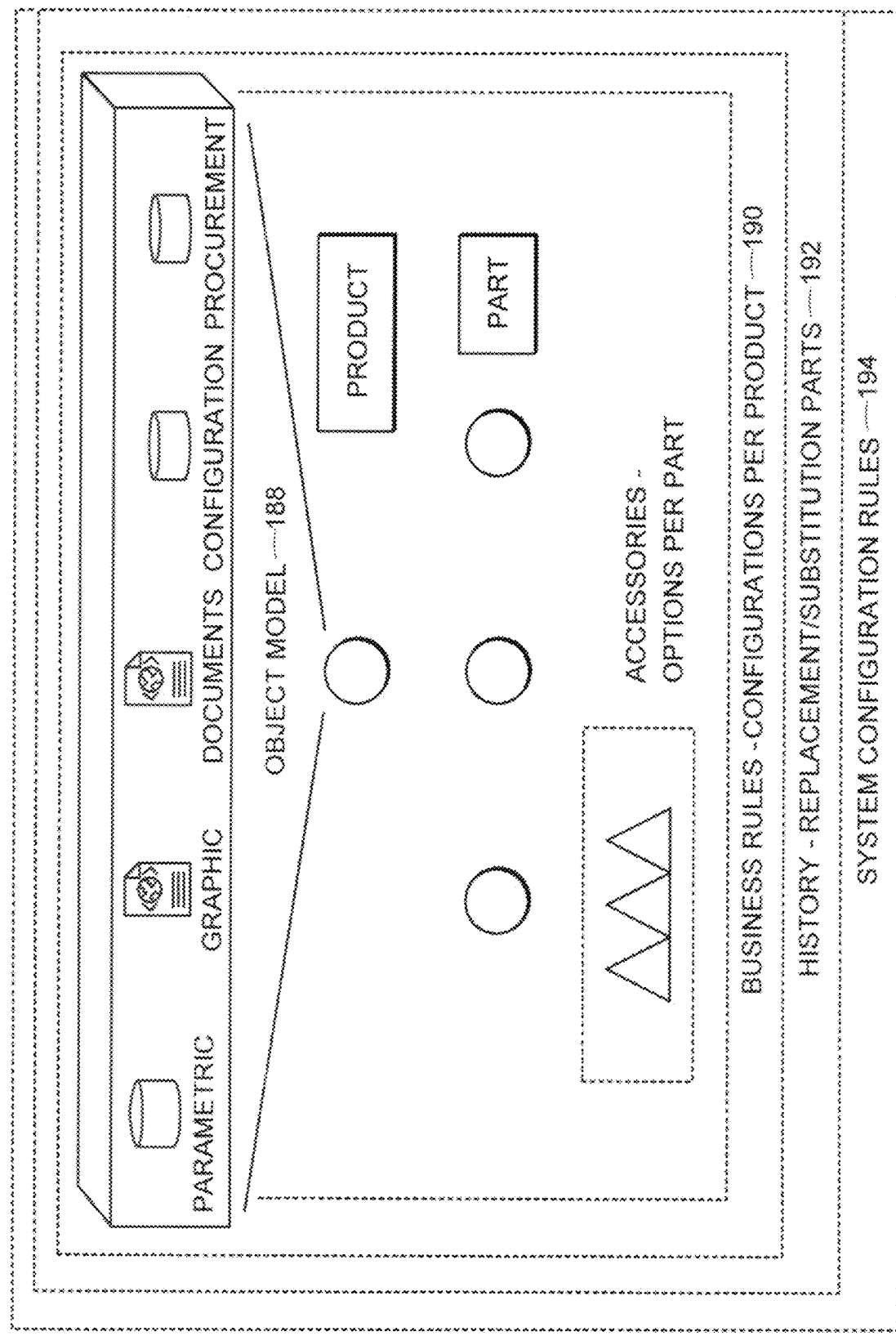
FIG. 6 is an illustration of the object model and configuration rules of the central database repository.

FIG. 6 is an illustration of the object model and metadata components of the central database repository. The object model 188 interacts with the parametric objects, graphic objects, document objects, configuration business rule objects, and procurement rule objects to represent a product. Products are made up of parts or components. A bill of materials (BOM) for a product lists its parts. Each part may have a list of accessories (options) for that part. Offering the users accessories at design time enhances the chance that the user will purchase additional options because of the case of use and guarantee that the options are appropriate.

An important part of the metadata 186 are sets of rules, including business rules 190, replacement/substitution parts (i.e., history) rules 192 and system configuration rules 194. Business rules 190 define appropriate configurations of products and can detect improper combinations. For example, when designing a telecommunications closet an equipment cabinet may be required. Since venting of equipment cabinet in order to reduce heat buildup is required, a fan is typically installed in the cabinet. But, because some fans are only appropriate for top mounting and other are only appropriate for side mounting, the designer must choose the correct type in order for the equipment cabinet to perform properly. Conventionally, a designer would gather this information through past experience, by combing over paper-based catalog specifications or by making numerous call to the supplier's customer support staff. The business rules 190 provide for encoding of configuration information such that compatibility checking is done automatically.

Replacement/substitution parts rules 192 provide part interchange information. The life cycle of parts is variable. Some parts remain unchanged and in production for years, but others are replaced or upgraded while their previous incarceration are still installed in the field. An owner who needs to replace a part must be able to find a suitable replacement. Replacement/substitution parts rules 192 provide mapping of parts to update/replacement information. This allows existing products to be maintained in a timely and effective manner.

System configuration rules 194 specify system-wide constraints for products. While individual components within a system might meet all known requirements, their combination might violate a known system-wide constraint. For example, while each component within a rack of a telecommunication cabinet might meet all requirements, the combination of components may prevent the cabinet from interfacing to another required piece of equipment. System configuration rules 194 provide system-wide constraints checking. System configuration rules may also include "budget" rules. Budget rule keep a running total of attributes of the product being added to a system to ensure that certain predefined thresholds are respected. For example, each product added to a system has a specific weight, any one product alone may not exceed the predefined weight threshold, but the sum of the product weights might. Other thresholds include dimensions, weight, temperature, power consumption, air flow, cost and the like.

Figure 7:
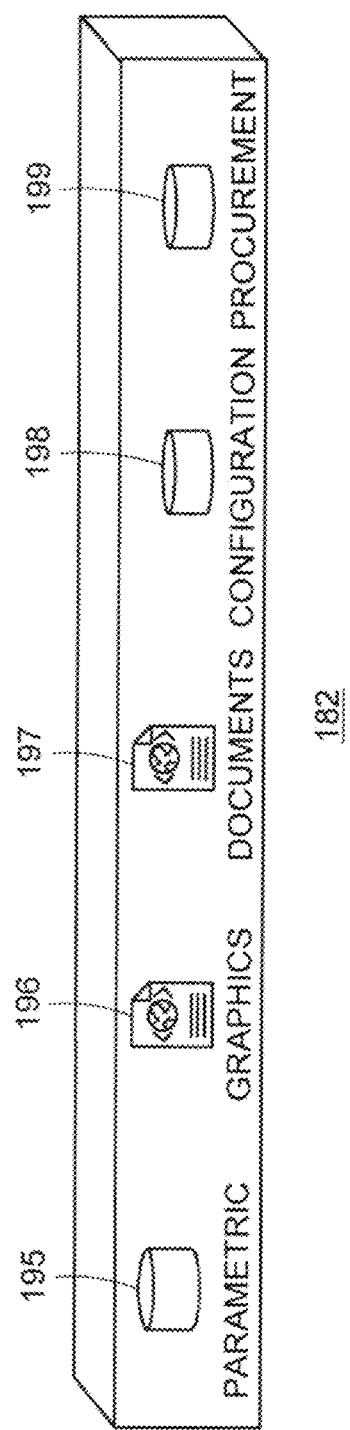
FIG. 7 is an illustration of the reusable objects.

FIG. 7 is an illustration of the reusable objects. The reusable objects 182 include parametric data 195 (e.g., attributes), graphics 196 (e.g., bitmap and SVG), documents 197 (e.g., XML), configuration data 198 and procurement data 199. The present invention utilizes central database repository 108 to provide a product catalog (multimedia e-catalog 110) that accommodates a broad set of attributes and flexibility in creating an unlimited number of product categories without custom programming.

Figure 8:
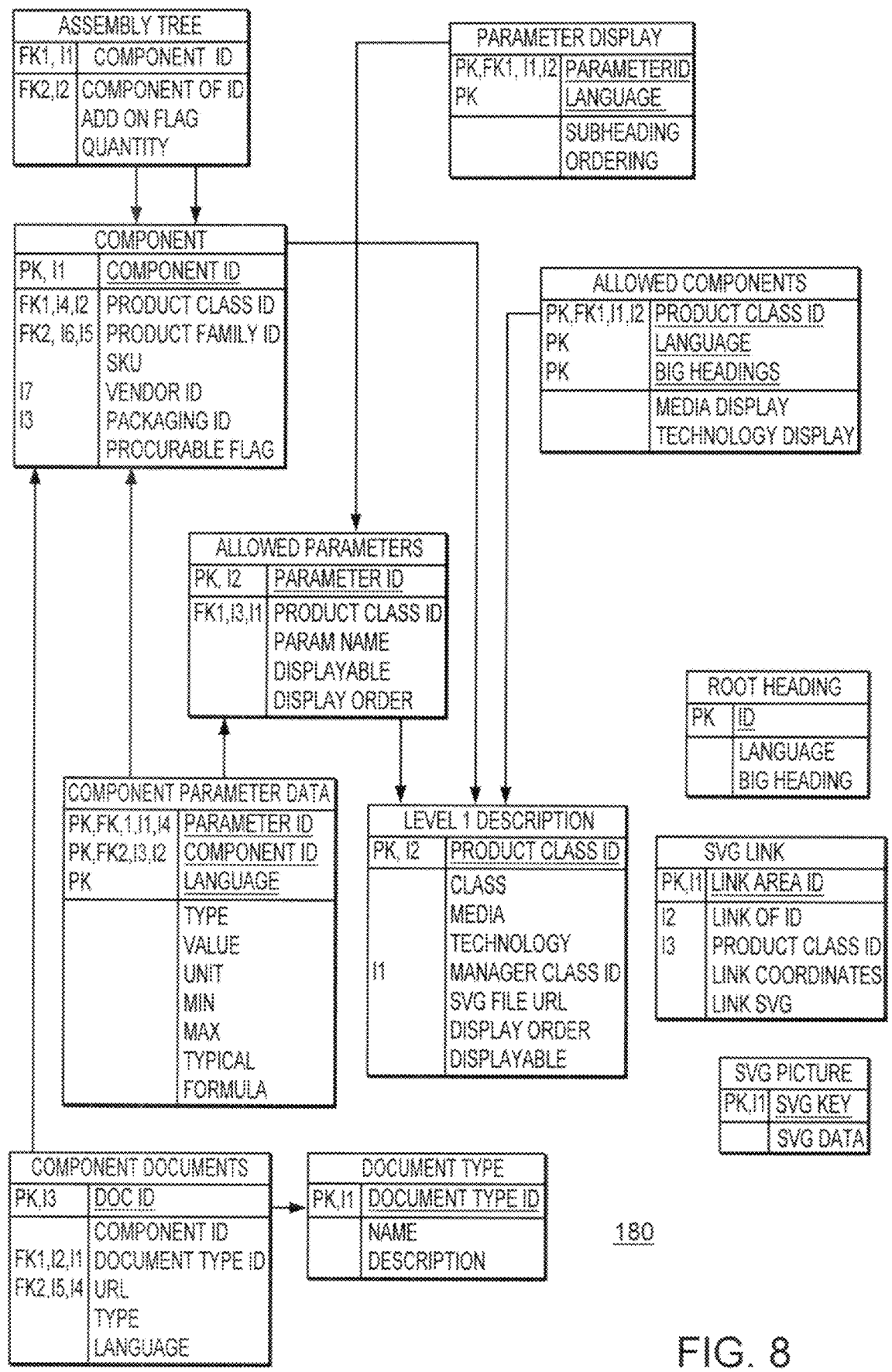
FIG. 8 is an entity-relationship diagram of a schema configured according to an embodiment of the present invention.

FIG. 8 is an entity-relationship diagram of a schema configured according to an embodiment of the present invention. A generic scheme 180 (data model) of the present invention allows for the description of complex products with the following features:

Unlimited Number of Product Types: describe any type of product,

Unlimited Number of Attributes: allow storage of an unlimited number of parametric or text attributes, Complex Parametric Descriptions: allow for incorporating units of measure (e.g., 5 USD), quantity descriptions (e.g., 5 USD per dozen) and conditions to each parameter (e.g., "on Wednesdays"), Configuration Rules: store rules for products and product lines. These rules include knowledge of allowable features per product, optional add-ons. The scheme also incorporates knowledge of upselling between product families (e.g., the cost to upgrade from a 100 Mbs configuration to a 1000 Mbs configuration, Unlimited Document Types per Product: stores an unlimited number of documents for each product, Unlimited Multimedia Types per Product: stores an unlimited number of multimedia images per product including: JPEG, GIF, SVG vector images, streaming video, etc.

The scheme 180 contains tables and fields for defining attributes of the product data as well as links to define the interrelationships between the data. Rule, including triggers are also stored and provide integrity, access control and security, among other features, for the e-catalog 110 of the present invention.

Figure 9B:
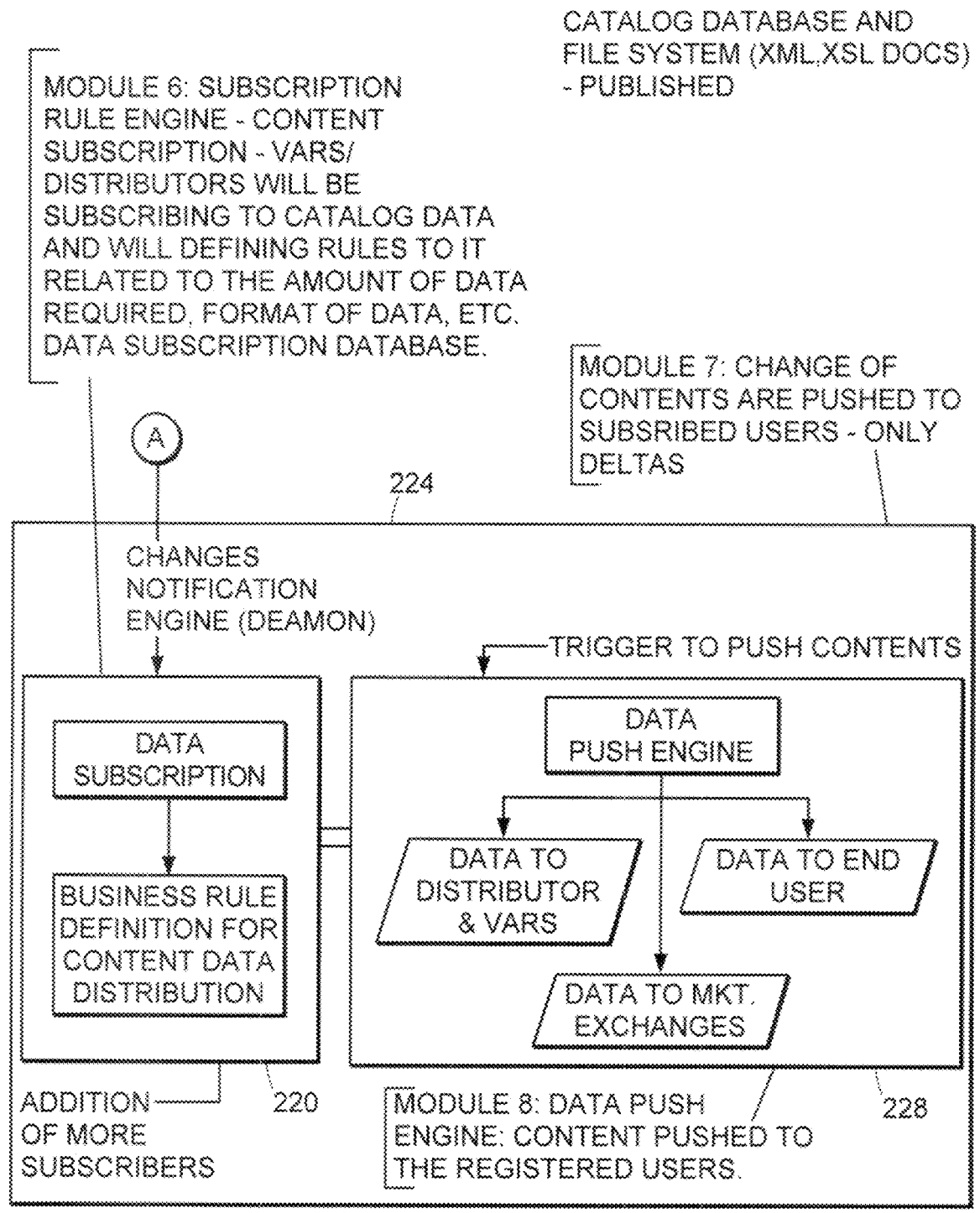
FIG. 9 is a flowchart that includes FIGS. 9A and 9B showing the data entry, internal QA, authoring, vendor QA, publishing, subscription rules, and data push modules that compose content translation functionality configured according to an embodiment of the present invention.

FIGS. 9A and 9B are a flowchart of the data entry, internal QA, authoring, vendor QA, publishing, subscription rules, and data push modules configured according to an embodiment of the present invention. These modules provide support for the Content Translation System.

Module 1, the Data Entry Application 200 provides content enrichment and linking. It takes as input MS-Word documents, other technical publishing product's documents, paper input for transcribing data, RDBMS download, or the like. It outputs a data entry database, in a preferred embodiment this is an Oracle 8i RDBMS, and files in the data entry scheme. The data entry database scheme accommodates at least two copies of the same SKU. There can be six, or more, separate content development processes running in parallel. The content that must be entered and linked for each Part (SKU) is described below:

|  | Punchout Link | Symbols | Graphics | Technical Specifications, Data Sheets, Installation Notes | Parametric Data |
|---|---|---|---|---|---|
| Content Source and Type | Custom Development | Custom Development | Edit of Existing Graphics or new Development | Word Documents or Interleaf or Other Publishing Product | Custom Entry or Download from an existing RDBMS. |
| Data Entry Application | General Data Entry Status Screen (FORM 2) | AutoCAD Store IGES and convert to SVG | AutoCAD DWG convert to SVG. Additional XML editing | Technical Publishing Software Converted to XML | Parametric Data Entry Software (FORM 1) |

|  | Punchout Link | Symbols | Graphics | Technical Specifications, Data Sheets, Installation Notes | Parametric Data |
|---|---|---|---|---|---|
| Customization Files | One per Content Subscribers | End User Programmable |  |  |  |
| Language Dependency | None | Yes | Yes | Yes | None |
| Internationalization | None | Yes | Yes |  |  |

A custom data entry application must be built for each of the custom data entry processes. In addition, a report module must present the status of the data entry for each part. A screen will provide a generic format for entering parametric data. A general data entry status screen provides a method for linking all of the content together.

| SKU # | Parametric Type | Data Entry 1 | Data Entry 2 | Compare |
|---|---|---|---|---|
| 1234 | Punchout Link | //aaa/bbb/ccc | empty | NA |
| 1234 | Symbols | Complete | Complete | Complete |
| 1234 | Graphics | Complete | Empty | NA |
| 1234 | Technical Specifications, Data Sheets, Installation Notes |  |  |  |
| 1234 | Parametric Data | Complete | Empty | NA |

Data entry for an SKU will be considered complete when all six types of content have been entered twice and are stored in the database. The primary key in the data entry database must accommodate this intentional redundancy. This will then be turned over to the internal QA module for processing.

Module 2, Internal QA 204, provides compare, internal QA, check-in and version control. It takes as input two copies of content for each SKU. It outputs a single corrected copy of the content for each SKU in the data entry database scheme. This module has three key functions: 1) compare 2) QA and correction and 3) check-in. The compare function executes a compare of the two copies of content for the SKU, any differences will be flagged by this compare utility. The QA and correction function allows the QA person to select and create a totally correct copy. The redundant copy will be discarded. The check-in and version control function works on the corrected copy of the data that has completed the internal QA cycle and will be checked-into a release area. The release area is the final stop for data kept in the data entry scheme. This area will have full source code control capability with versioning (equivalent to a PVCS-like system). Any further corrections to the content must be directed to these files. All prior versions will be kept under source code control.

Module 3, Catalog Authoring 208, provides catalog authoring. It takes as input a single corrected copy of the content for each SKU in the data entry database scheme and outputs a database in the catalog scheme. This module will create a database in the catalog scheme format utilizing the following steps. Custom indexes for the final scheme are created. A custom indexing strategy is used so that small subsets of data can be kept at the client side. These small subsets would allow users to perform queries quickly without downloading all of the rows from the back-end database. A transform is performed on the Data Entry Database Scheme to transform the physical scheme from the data entry database scheme to the catalog scheme. Some of the content can be stored in Oracle 8i (or other appropriate DBMS). Other data will be stored in a file system outside of the DBMS. Links will be created between the data content, including all of the links necessary inside and outside of the DBMS. This DBMS and associated file system can reside on a specialized file server and can be linked to the vendor's website in a seamless fashion. This module has a start/stop capability. If the processing time is too long the program will be stopped and allow for an incremental compilation capability.

Module 4, Vendor QA 212, provides vendor QA, access rules and final release. It takes as input a database in the catalog scheme and outputs corrected catalog content, access permissions for each user type and vendor style sheet. Vendor QA allows product managers for each product the ability to provide final approval for publication of content. The supplier's product manager will be able to review the content using the catalog software used by the buyer. Corrections to content and reauthoring are provided. If the product manager encounters any errors they can make changes using Module 2. After making corrections in the data entry database they must repeat the authoring process to create a new copy of the catalog database. Once the content has made it through the final vendor QA cycle it is ready to be hosted and linked into the vendor Web site. The vendor can set access rules which govern access to different types of content and analysis tools. The vendor will be able to set access with simple check box using two parameters: user type and content/tool type.

| Content/User Type | Any-But requires Registration | Design Consultant | Install and Integration | Sales, VAR, Distributor |
|---|---|---|---|---|
| White Paper | X | X | X | X |
| Symbols |  | X |  |  |
| Price, Availability, Proximity |  | X |  |  |
| CAD Graphics |  | X |  | X |
| Technical specifications, Installation Notes |  | X | X | X |
| Configuration Tools | X | X | X | X |

The vendor will be able to change the access rules without having to be an author of the catalog. The vendor will be able to specify the look and feel of the catalog using vendor style sheet specifications. This will make the product catalog (e-catalog) look consistent with the vendor's corporate Web site. The look and feel of the e-catalog is describes using various attributes, including logo and placement, background colors, font size and colors per their corporate style sheet, as well as the use of frames. A predefined set of codes specifying language type will also be used. The browser type (e.g., Microsoft Explorer, Netscape Navigator, etc. . . . ) and revision level will be specified in the header and this will be passed as HTTP data. There is no need to update this in a file since access to this information is available during the session.

Module 5, Catalog Publication 216, provide catalog publication and live connection to distributor data for price, availability and proximity information. It takes as inputs a database in the catalog scheme and Web methods (e.g., connection to distributor/VAR systems). Module 5 outputs a catalog with distributor data integrated and a file for distributor data updates. This step makes the catalog live. In addition, data subject to frequent change and specific to distribution partners will be dynamically updated. The vendor must set a file which will govern the update process for information from the channel partners, including specific attributes, conversion for attributes, frequency of update, default language, DTD mapping, and the like.

Module 6, Subscription Rule Engine 220, provides a subscription rules engine and takes as input business rules download by subscription type and a user changes notification profile. It outputs a messaging engine download rules file. The subscription model will refer to the rules for subscription by subscriber type. Based on previous downloads to each subscriber, the engine will setup a file which will tell the messaging engine exactly what content to send to whom.

Rules by subscriber identity can be set by the user. There are three types of subscribers (channel, exchange and end users). Each subscriber will complete a subscription form telling the system what type of data they are interested in. Each subscriber type will have different options for different types of data. End users will be fed updates only for the type of data to which they are permitted access. Access privileges are set in Module 4 by the vendor. Updates will only be forwarded if the user has a) previously downloaded an excerpt of this content or b) indicated to the notification manager that they want notices and updates of changes. Distributors and VARs (channel partners) can select the breadth (number of parameters and data types) of data they want to download as well as the depth (number of SKU's) they want to download. Exchanges can also select the breadth (number of parameters and data types) of data they want to download as well as the depth (number of SKU's) they want to download. Each Subscriber will have to indicate transfer rules, including a file transfer method, a file format and the frequency of download. For the file transfer method each subscriber will be able to select eMail, FTP, or the like. ASCII file format settings will be able to be set including: tab delimited text, standard XML format or any proprietary format (e.g., gXML). The frequency of download settings includes a "by time" interval, or a "by change in content" interval, among others. It is expected that large companies will have proprietary formats which the present invention will provide as a part of its functionality.

Rules by subscriber type can be provided and are set by the vendor. Vendors can set rules for the minimum amount of data that channel partners and exchanges are allowed to download. This allows them to protect their differentiation. In addition to all of the standard content for each SKU, the vendor can set additional fields for download including: punchout links, branding marks and time stamps. A punchout link back to the supplier hosted catalog can be defined. This link can be set to the very top of the catalog or to be a specific SKU in the catalog. The vendor can insert a branding mark for each row in the distributor or exchange catalog noting that this is "authorized content". Additionally, the vendor can force the display of a time stamp for the data making sure that the freshness of data is enforced at the target web site.

Rules by time of download are also provided. The breadth and depth of content to be downloaded will also be a function of prior downloads and the extent of revisions in the catalog. For the first time the catalog is published the subscription engine will send a full copy of the requested subset to each distributor, VAR or end user. The first time a VAR, distributor, or exchange requests a copy the subscription engine will send a full copy of the requested subset to each VAR, distributor, exchange. For all updates following the initial update to a VAR, distributor or exchange the subscription engine will send a full copy of the requested subset to each VAR, distributor, or exchange. The first time an end user requests an update on a downloaded document the subscription engine will see if there have been any changes for the entire document, symbol or CAD drawing. If there has been any change then the newly revised entire document, symbol or CAD Drawing will be sent. Documents will have change bars noting where changes have occurred.

Module 7, Change Notification Engine 224, is a change notification engine which takes subscription rule user profiles, date and time, and new content publications (triggers) as input. It outputs a list of necessary updates for distribution. This module is a daemon which runs continually in the background. It monitors the required frequency of updates for each subscriber which is stored in the subscription rule user profiles and the most recent delta changes to the e-catalog. When there is a change in the e-catalog that affects an area that a subscriber requires for download then the module determines if it is time to send this change. For example, when subscribers want weekly updates, one e-catalog update can occur on Day 3. Since this change is before the required update cycle the change will be held until the clock registers a full week from the last update. If another update occurs on Day 4, then both updates will be forwarded when the clock registers a full week.

Module 8, Data Push Engine 228, provides a data push engine and takes as input a list of necessary updates for distribution, and eMail addresses from the subscription rule engine. It outputs a downloaded file to each subscriber. The subscription model will refer to the file produced by Module 7 and download information to each subscriber.

Figure 10A:
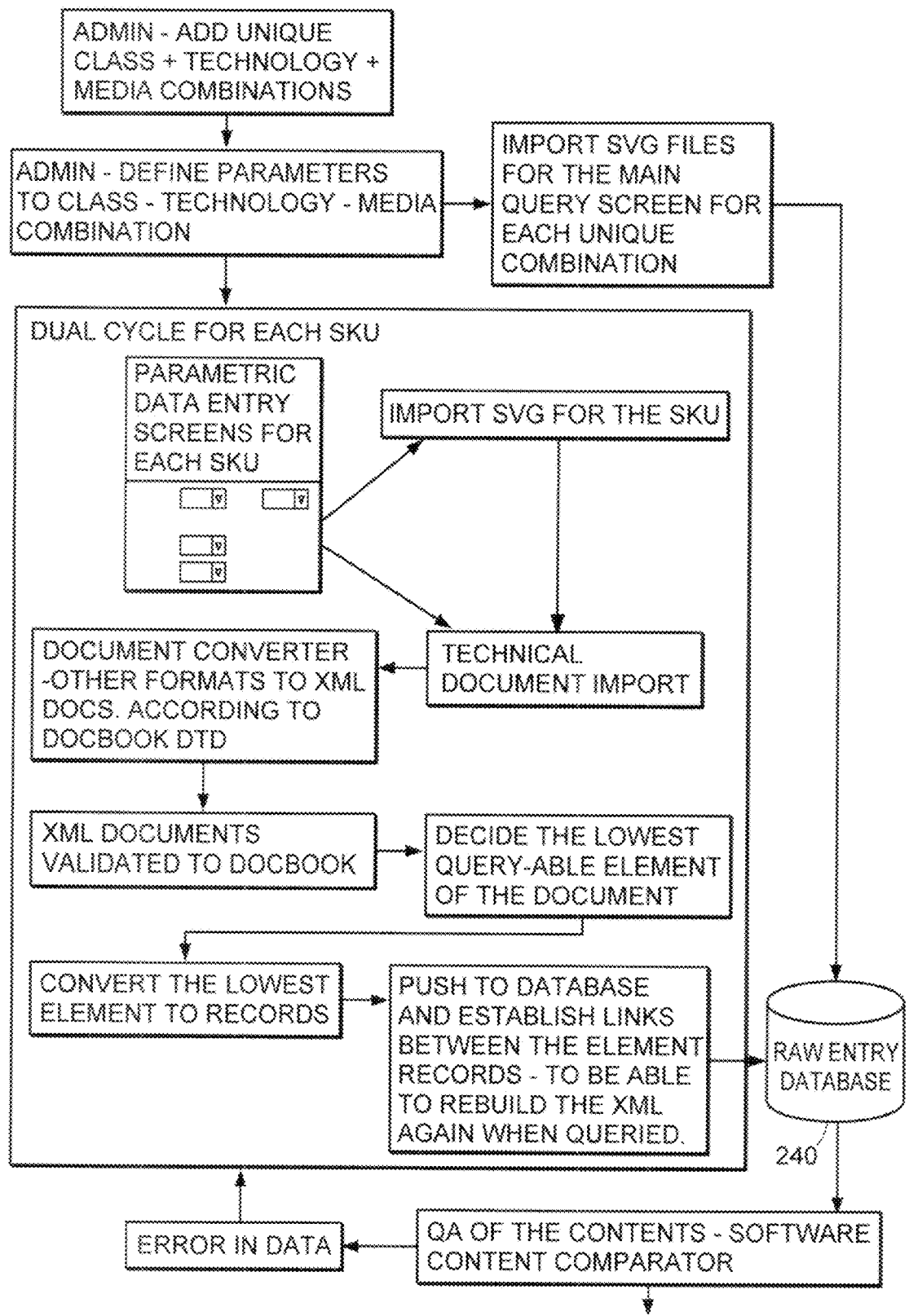
FIGS. 10A, 10B and 10C are illustrations the data entry, internal QA, authoring, publishing, subscription rule engine, delta data push and subscription rule modules that compose content translation functionality configured according to an embodiment of the present invention.
Figure 10B:
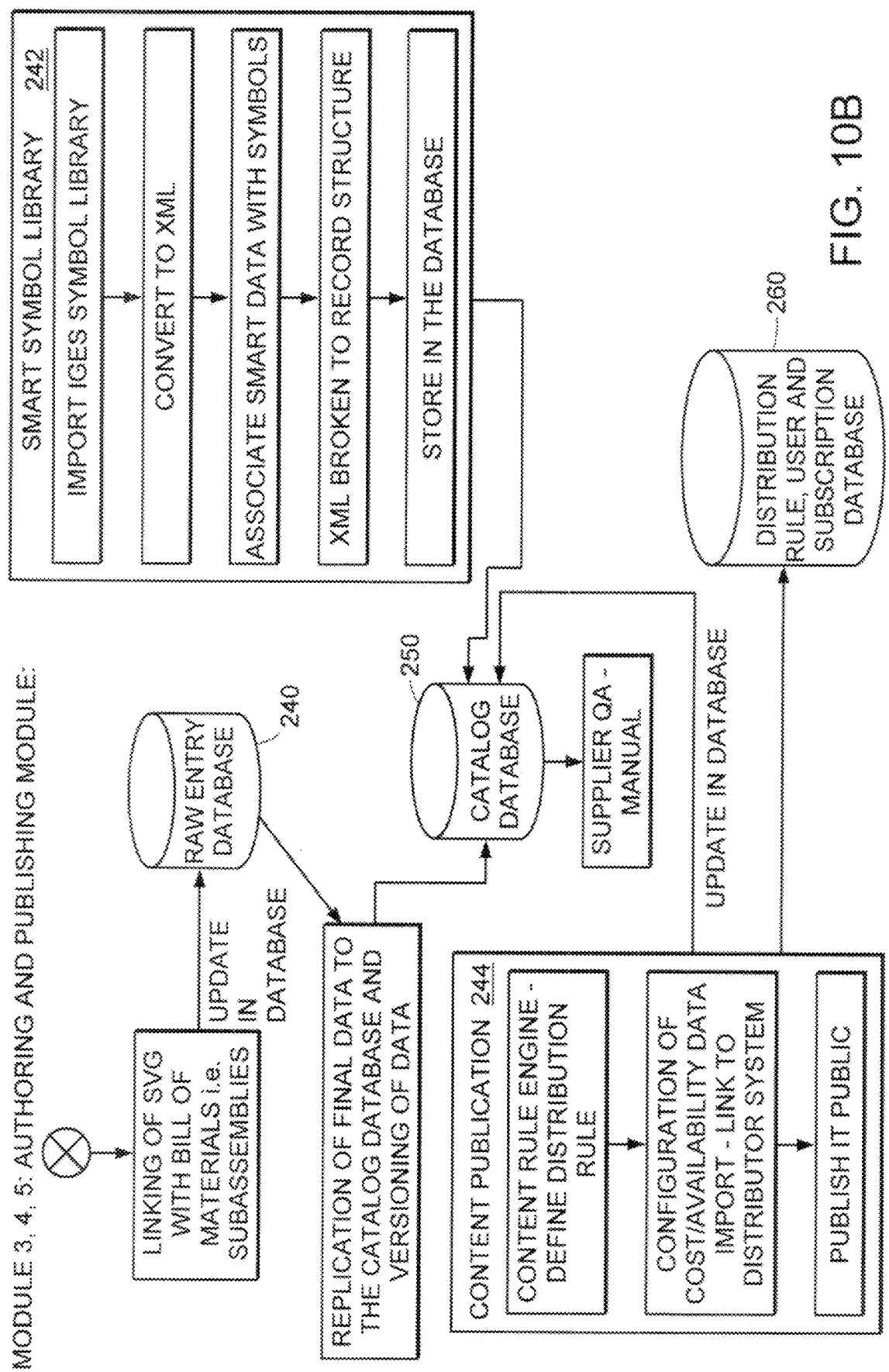
Figure 10C:
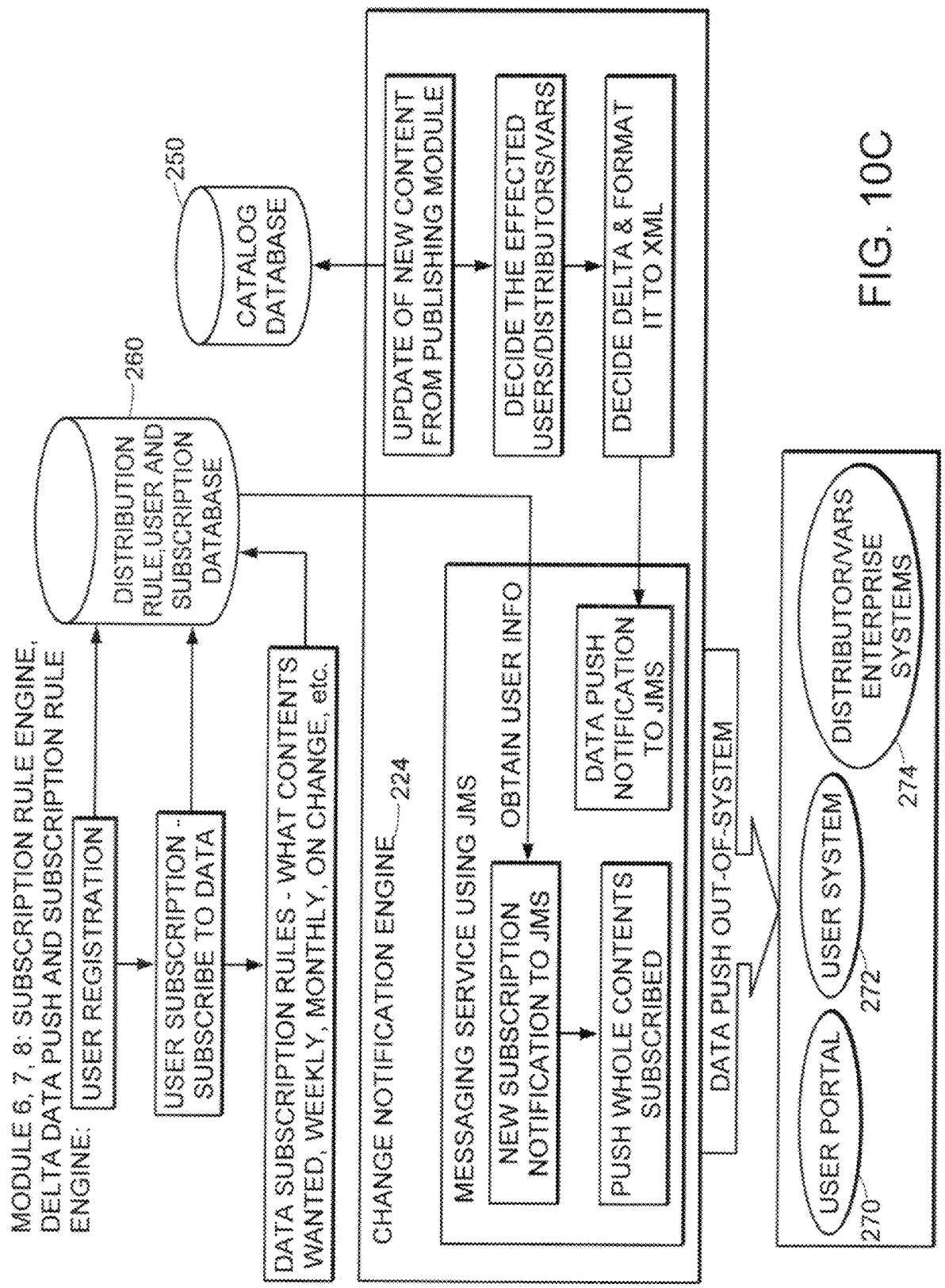

FIGS. 10A, 10B and 10C are illustrations the data entry, internal QA, authoring, publishing, subscription rule engine, delta data push and subscription rule modules configured according to an embodiment of the present invention.

Module 1, Data Entry Application 200 and Module 2, Internal QA 204 provide a series of steps to gather content from various media combinations, including parametric data and SVG file. The content is imported, converted and pushed to a raw entry database 240.

Module 3, Catalog Authoring 208, Module 4, Vendor QA 212, and Module 5, Catalog Publication 216 generate a catalog database 250 and distribution rule, user and subscription database 260 from raw entry database 240, smart symbol library 242 and content publication 244.

Module 6, Subscription Rule Engine 220, Module 7, Change Notification Engine 224, and Module 8, Data Push Engine 228 manage getting content data out of the e-catalog 110 system. Specifically, the change notification engine 224 interacts with distribution rule, user and subscription database 260 and catalog database 250 to push data to user portal 270, user system 272 and distributor/VAR enterprise systems 274.

An intelligent product catalog system for electronic creation, management and viewing of the product scheme uses a multimedia display system including an electronic text window 300 linked to an electronic graphics window 310. The software navigates views of the product information within the electronic text window and electronic graphics window. The query engine of this e-catalog 110 provides unprecedented flexibility. Users can add new product types and attributes per product type without having to reprogram the software. The custom indexing scheme 180 provides for unprecedented speed. XML technology allows interoperability and intelligent graphic objects provide for showing their hierarchical decomposition into Bill of Materials or features.

Figure 11:
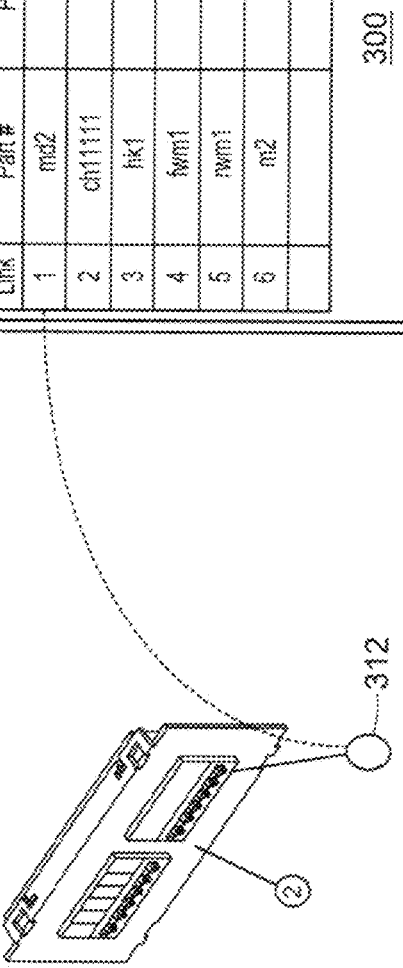
FIG. 11 is an illustration of an end user view of the intelligent multimedia e-catalog as provided by a preferred embodiment of the present invention.

FIG. 11 is an illustration of an end user view of the intelligent multimedia e-catalog as provided by a preferred embodiment of the present invention. The e-catalog 110 illustrates catalog parts utilizing intelligent vector graphics. Network infrastructure products are technically complex, often with many subassemblies and separately purchased options. It is not sufficient to show a simple photograph in JPEG format for users to make product decisions. The present invention provides a fully illustrated parts catalog showing all of the subassemblies for a product in an easy to read 3D engineering drawing. The 3D vector graphics are fully intelligent and linked inside of the catalog. Selecting a "hot link" 312 on the drawing will bring up all of the product details on the separate subassembly part including its SKU number and associated technical documentation. This makes the e-catalog 110 ideal for design, procurement and service applications throughout the product life cycle.

The view allows for configuration of systems composed of products having components. For example, a telecommunications cabinet (system) may be made up of various routers, power supplies and interconnect cables (products), the power supply may be made up of a switch, a fuse, a power source and a power cable (components). This hierarchical design provides for an infinite variety of system, product and component configurations. As components are added to the system the electronic graphics window 310 is re-rendered to show the added component. Additionally, 3D animations provide for views of working components (e.g., a cabinet door opening and closing). The view also displays units (e.g., dimensions, costs, weights) along with a process for converting among various representations of the units (e.g., inches, feet, meters, etc.). The view presentation is configurable as to which attributes are shown, and in what order.

Systems, product and components also have options, options provide different versions of a specific system, product or component. For example, a telecommunications cabinet may provide the option of having a top venting fan, a bottom venting fan, or a side venting fan.

The view also allows for "add-on" products to be displayed and configured into the system being designed. Add-on products are complementary or other associated products that may be of interest to a designer working with a specific product. For example, a glass cleaning product may be offered along with a telecommunication cabinet having glass door enclosures.

Figure 14B:
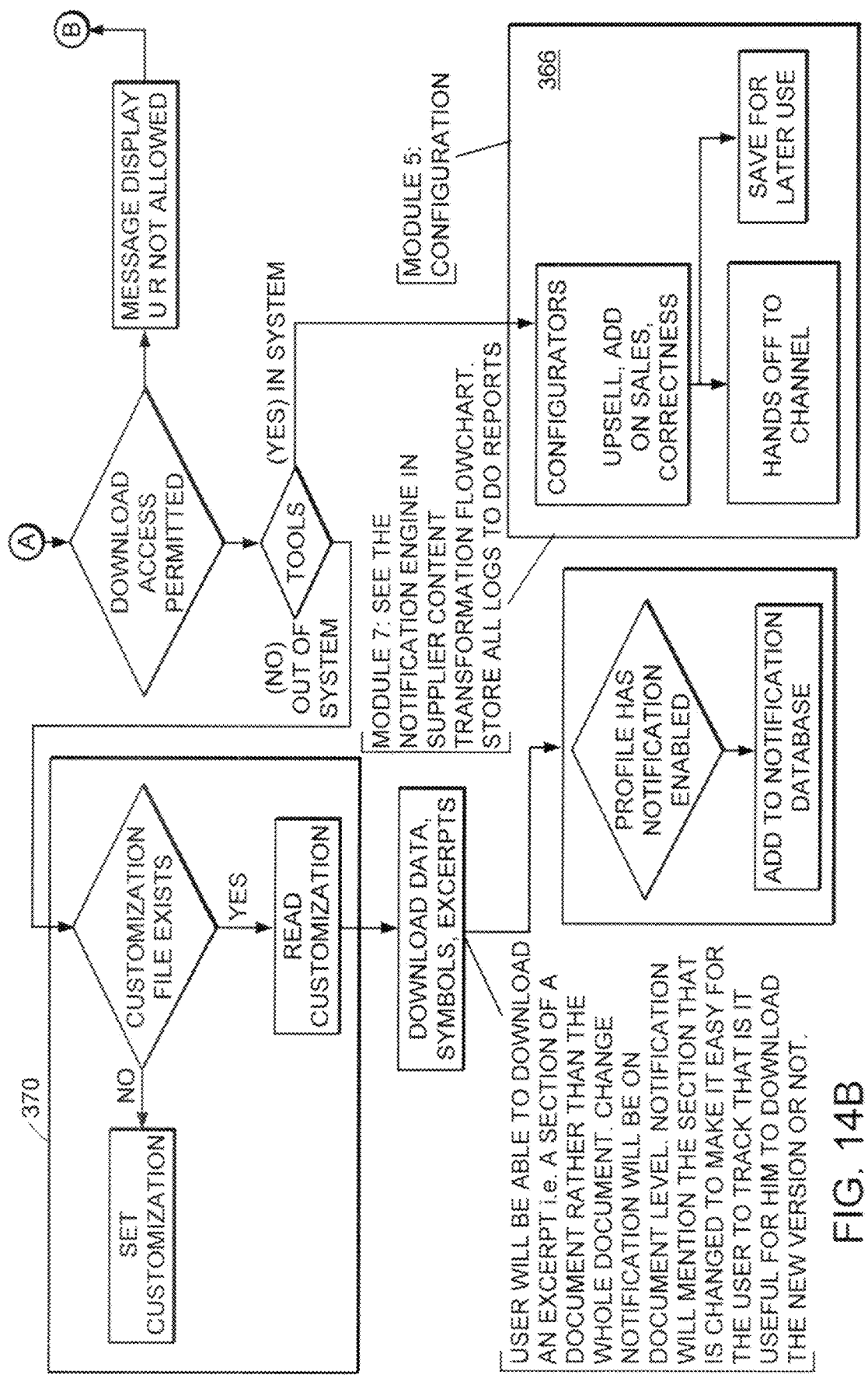

FIGS. 14A and 14B are a flowchart of the query engine, style management, market basket guest registration and customization modules that compose access and viewing functionality configured according to an embodiment of the present invention.

Module 1, Style Management provides a style manager that takes as input a language, a browser type and a vendor style. It outputs a style sheet. When the vendor's Web site or exchange invokes the e-catalog it must update the e-catalog style sheet. The rules for the update are specified in Module 4 for the Content Translation System.

Figure 12:
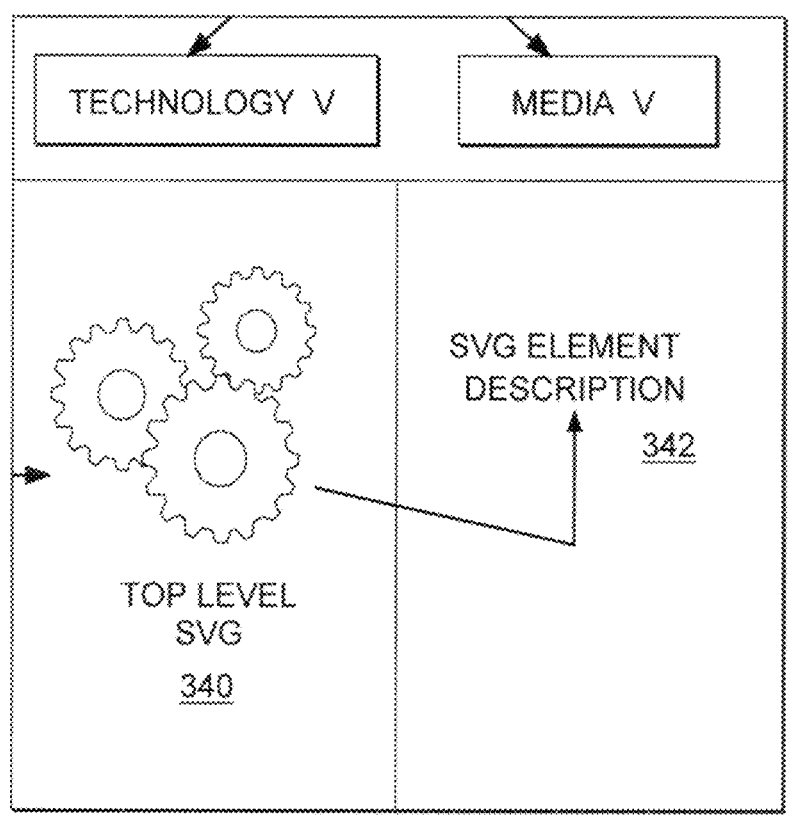
FIG. 12 is an illustration of a multimedia display window configured according to a preferred embodiment of the present invention.

Module 2, Query 354, provides a query engine that, if invoked from an exchange will accept a specific part query and output a market basket. FIG. 12 illustrates of a multimedia display window for the query engine. A top level SVG 340 displays a product component and product component element descriptions 342. As the end user mouses over different elements of the top level SVG 340 the SVG element description 342 will change. A click on any of the SVG links in the top level SVG 340 takes the end user to the next screen of the individual assembly. Various window navigation steps are detailed below:

| Bring up Main Window with Contents Initialized | Bring up Main Window (Get stuff from Level One Description Table) Fetch the SVG for main graphics and corresponding Media, Technology and description combination Create Split window Put Drawings on Left and Text Description on Right | Get class items from Level1 Description (Get all Class ID, Media, Technology and description. (Select * from Level1Description) Fetch the SVG file according to the SVGFileURI field value in the record. Combine the record and SVG file contents into and generate a html and XML combination with JavaScript to handle the change of SVG graphics according to media and technology selection by the user in the pull down combo box.- Handle on select event of the .html combo. SVG should be embedded into the html. Handle the mouse over of the SVG elements to show the description of each part on the right-hand pane. |
| --- | --- | --- |
| Change Main Window | If Pull Down Selectors changed then change window Change the ClassID's in the Pull Down for this Technology and Media Setting. Get graphics from SVG graphics table. | (see above) |

Figure 13:
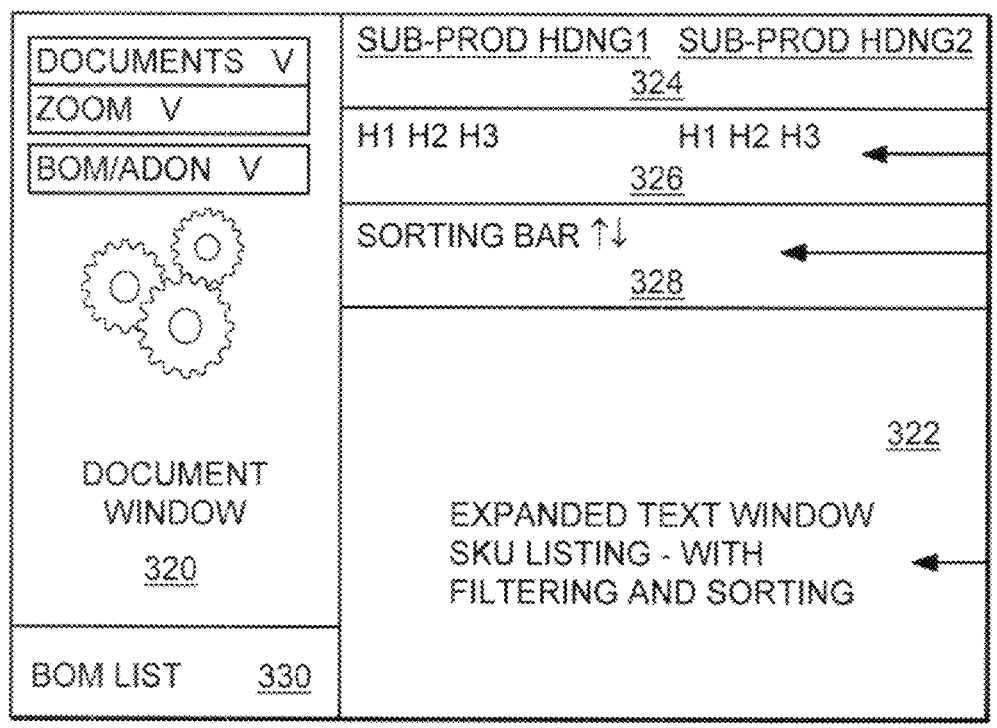
FIG. 13 is an illustration of a hierarchical multimedia display window configured according to a preferred embodiment of the present invention.

An illustration of a hierarchical multimedia display window is provided in FIG. 13. A document window 320 displays an SVG rendition of a product component, various documents associated with the product component can be accessed and the display can be zoomed. Additionally, bill of materials (BOM) and add-on information can be obtained. An expanded text window 322 provides an SKU listing with filtering and sorting. Clicking on an SKU list item changes the SVG display and the corresponding BOM list. Contents in the SKU list can be sorted using sorting bar 328 according to headings. Sub-product headings 324 and parameter headings 326 provide for a hierarchical listing capability. A BOM list 330 provides for clicking on an item to highlight the part on the SVG display of the whole assembly.

| Navigation Action | Description of Actions | Pseudo Code |
|---|---|---|
| If Item Class Selected then present all items for class selected | GET ROWS FOR ALL SKU's | GET ROWS FOR ALL SKU's and corresponding documentation and SVG graphics. Select * from Component c, ComponentDocuments cd Where c.ProdClassID = L1Description.ProdClassID and cd.ComponentID = c.ComponentID |
|  | GET BIG HEADINGS FROM ALLOWED COMPONENTS | GET BIG HEADINGS FROM ALLOWED COMPONENTS Select Big Heading from Allowed Components where Language = <Language> and CLASSID in (Select PRODUCTCLASSID from LEVEL1DESCRIPTION where MgrCLASSID = PRODCLASSID) |
|  | GET SUBHEADINGS FROM ALLOWED | GET SUBHEADINGS FROM ALLOWED PARAMETERS AND |
| PARAMETERS AND PARAMETER DISPLAY | | PARAMETER DISPLAY Select SubHeading from Parameter Display where Parameter ID in (Select ParameterID from ALLOWED PARAMETERS where CLASS ID in (Select PRODUCTCLASSID from LEVEL1DESCRIPTION where MgrCLASSID = PRODCLASSID) and Displayable=True and Language = <language> GET Parametric Data for Rows Select * from Parameter where (Comp Key =< > and ParameterID in (See Prior Query)) or (Comp Key =< > and ParameterID in (See Prior Query)) or ... à for all the components selected from the component table. First Row is Default Selectable in SKU Listing. Combine and arrange the whole contents into an XML combined with XSL, HTML and JavaScript to produce the required GUI and event handling. |

Navigation inside the window, once beyond the main window is provided in the following manner:

| Navigation Action | Description of Actions | Pseudo Code |
|---|---|---|
| Move Cursor to new SKU in Expanded Text Window | Update SVG for Document Window Update Combo Box Options for Document Window Update BOM for BOM Window-Highlight First Row in BOM Window | Handle the mouse over event of the sku links. Change the contents of the BOM through JavaScript code and fill it with new values retrieved from the XML lying on the client side. |
| Select Hot Link on SVG Graphic in Document Window | Highlight Associated Item/SKU (if applicable) in BOM Window Color Hotlink | Handle the onClick, retrieve the Component ID value from the SVG, find it in the BOM list and highlight. |
| Select New Document from Document Pull Down in Document Window | Update Document Window with New Document for SKU Currently Highlighted/Selected in Expanded Text Window | Handle the OnSelect event of the list and update the Document window |
| Select Item from BOM Window | Highlight Associated Hotlink for Item/SKU (if applicable) in Document Window | Get the input(ID) from the BOM list selection event and highlight in the SVG |
| Select Button on Item/SKU in BOM Window to get details for Sub Assembly Note: This is envisioned to be a Field Service Application where someone wants specific documentation on a replacement sub module of a specific product | Open Child Window which is of same format as top window Put Level + 1 in Expanded Text Window for headings of this Sub Assembly Type. Load in SKU's matching the query criteria of prior Parent Window into Expanded Text Window. e.g. ONLY ONE PART. | Same queries as explained above but The component ID changes The query carried to the server so that the resulting contents in the new window will be according to it. |

-continued

| Navigation Action | Description of Actions | Pseudo Code |
|---|---|---|
| | Put CAD of Level +1 Subassembly in Document Window<br>Update BOM for BOM Window<br>Highlight First Row in BOM Window | |
| Hit Big Header Col Span Button in Expanded Text Window<br>Note: This performs same action as above. No new code should be needed. In each case the software inherits the criteria of the prior query set. | Open Child Window which is of same format as top window<br>Put Level + 1 in Expanded Text Window for headings of this Sub Assembly Type.<br>Load in SKU's matching the query criteria of prior Parent Window into Expanded Text Window. E.g. if parent window had only copper, LAN Patch Panels and a Filter by 24 ports then only subassemblies for all of these parts will be shown.<br>Put CAD of Level + 1 Subassembly in Document Window<br>Update BOM for BOM Window<br>Highlight First Row in BOM Window | Same as above |
| Pull Down changed from BOM to Add Ons | Find Add Ons for specific SKU<br>Display Add Ons in Document Window as graphics of a different color e.g. red and standard parts are black<br>Display Hotlinks with hotlink for first addon colored<br>Display text descriptions in BOM Window for Add Ons.<br>Highlight the first row. | Handle the onselect event of the BOM/Add-On combo.<br>Update SVG from the XML contents catched on the client side. |
| Select Item for Market Basket | Prompt for Quantity<br>Confirm Putting into Market Basket | Check if the user is a registered user.<br>If not prompt the registration form. After update the market basket or else directly update the market basket through JavaScript i.e. maintain the market basket on the client side till he saves.<br>Provide option for save now or later.<br>In case of save now contact to a server component to store and maintain market basket for the client |
| Change Language Selection | Change Language of Big Header<br>Change Language of Small Header<br>Change Language of Text Cells<br>Change Language of Units of Measure<br>Change Language of BOM Window<br>Note: assume no text in SVG Graphics Display<br>Change Text in Document Window If Document other than SVG Graphics selected | Call to server side with language code and ClassID on selection of Language-Code from the combo.<br>Handle the on-select event of the combo-box. |
| Select Sort by Column Heading | Sort All Rows by ascending or descending selection of that row. | Apply style sheet to the XML data using Jscript and rearrange the data and the Extended-Text window. |
| Select Filter by Column Heading | TAB 1: Present Select Distinct of all Values Sorted in Ascending Order<br>TAB 2; Allow Filter by Wildcards (Single Char, Multiple Char)<br>TAB 2: Allow Filter by Ranges of numbers | Generate XSL on the client using Jscript and apply it to the XML data to update the Extended-Text window. |

| Navigation Action | Description of Actions | Pseudo Code |
|---|---|---|
| Resize Vertical Frame Separating Document and Expanded Text Window | CLIPS OR RESIZES THE GRAPHICS WINDOW? SHOWS WHITESPACE IF DOCUMENT WINDOW LARGER THAN GRAPHIC | Automatically handled by the browser. |
| Resize Horizontal Frame Separating Document and BOM Window | CLIPS OR RESIZES THE GRAPHICS WINDOW? SHOWS WHITESPACE IF DOCUMENT WINDOW LARGER THAN GRAPHIC | Automatically handled by the browser. |
| Resize Total Window | | Automatically handled by the browser. |

Module 3, Market Basket 358, generates a market basket by taking a selected part from the query results screen and a list of parts (such as a BOM) as input. The market basket is a simple list of SKU's for a specific vendor. This market basket is used for analysis by the configuration tools or as a method to drive the download of extensive information per part.

Module 4, Guest Registration 362, provides guest registration. It takes as input the access permissions per each user type (described in Module 4 for the Content Translation System 106) and outputs a list of known registered users. This module checks the users name and designated user type against a list of known registered users. If the person is not registered then they will be prompted to register. The registration form is then forwarded to the vendor for approval. The vendor will have to update the list of known registered users. For each new user registered by the vendors an eMail will be forwarded to user alerting them that they have been updated. If the user is registered then it checks to see if the type of download or tool access is permitted for this user type. If the user is not permitted to use the download or configuration tool they will receive a message denying access and then pushed back to the query module.

Module 5, Configuration 366, provides configuration by taking the contents of the market basket and outputting a final list of configured contents to be handed off to the channels or stored for future use. This module completeness, correctness, upsell comparisons and add-on suggestions. To complete the assembly that the user is intending to build, the system suggests the remaining parts (subassemblies/assemblies) which are required and are not yet selected by the user. The system will check for the compatibility of the assemblies selected and suggest assemblies that are more efficient, have more features and/or have a better fit to the selected assemblies. This process references the product family attributes in the database. Related add-on products are suggested to complement the selected products, this process will reference the complements attribute in the database.

Module 6, Customization 370, provides customization and takes as input the contents of the Market basket. It outputs formatted technical documents and triggers to the notification engine. For customization of the downloads the end user makes a selection of the documents needed (all or selected documents) and selection of excerpts needed if not whole document. Additionally, the end user makes a selected output format, if the option is available. After the selections and download of documents by the end user, the customization module sends a trigger to the notification engine for the first time download and gets the notification activated.

Module 7, Change Notification Engine 224, provides a notification engine which takes as input a trigger from end user download customization or data subscription by distributors/VARs. Its outputs include new end users, distributors/VARs or market exchanges being added to the notification list with rules built in. The notification engine triggers the event for notifying the buyer while he is doing the downloads of the content if the supplier has pushed the updates to the end users. This feature is made possible when the user has requested this functionality while registering in the Module 4 above.

Figure 15A:
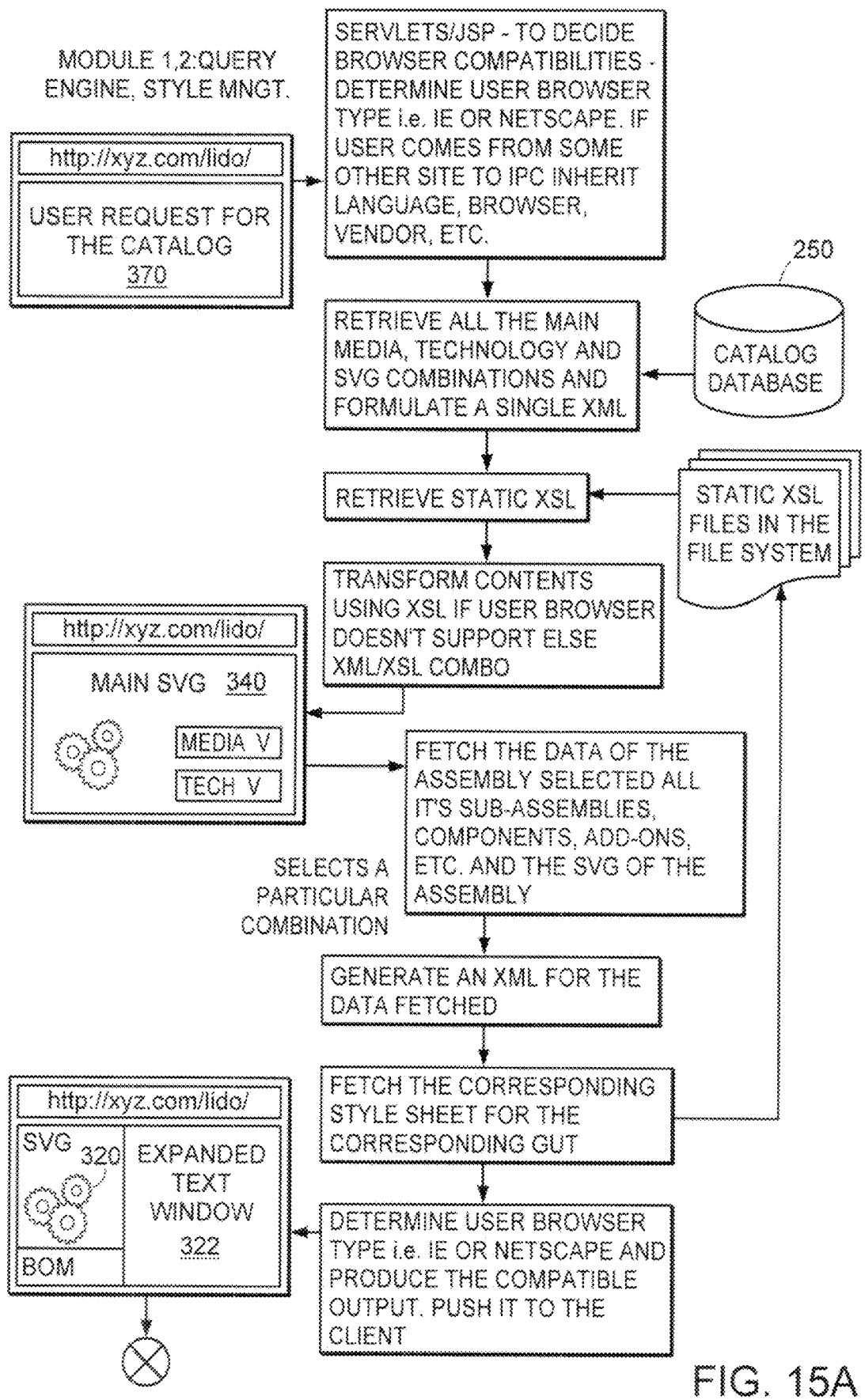
Figure 15B:
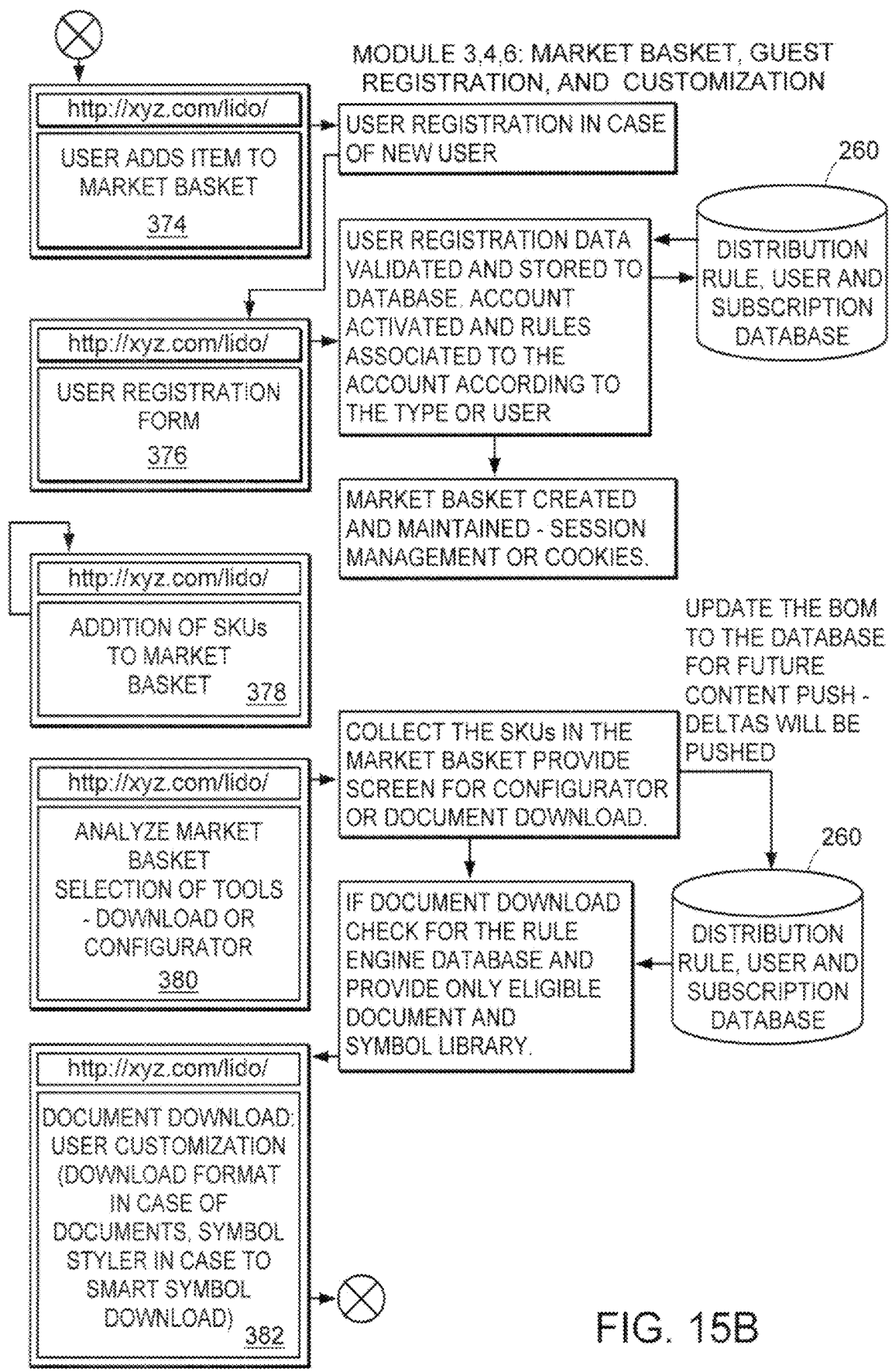

FIGS. 15A, 15B and 15C are flowcharts of the query engine, style management, market basket guest registration and customization modules that compose access and viewing functionality configured according to an embodiment of the present invention.

Module 1, Style Management 350 and Module 2, Query 354 provide a series of displays for product information. Initially a user interacts with a screen 370 to request information from the e-catalog 110. A main SVG display 340 is displayed and is transformed into a display of SVG document window 320 and expanded text window 322.

Module 3, Market Basket 358, Module 4, Guest Registration 362 and Module 6, Customization 370 provide a series of interactions with the market basket of product components. A user adds item to the market basket using screen 374. The user interacts with user registration form 376 in order to activate a user account. Additional items (SKUs) are added using screen 378. The market basket is provided to download or configurator tools using screen 380. Upon document download user customization of download format, including smart symbol download is provide using screen 382. In the case of smart symbol download the symbol styler 384 fetches symbol library data. Download symbols/documents 386 and URLs for download 390 fetch documents from the catalog database 250. Finally, the configurator 392 fetches the assembly hierarchy.

FIGS. 16A-16E illustrate using the intelligent multimedia e-catalog of the present invention to provide conversational-based customer support. Gartner predicts that by 2020 85% of customer interactions will be without a human agent and that chatbots (conversational engines) will replace over 90% of customer applications. Chatbots and conversational interfaces are simple and not to be underestimated in terms of their power. A chatbot has no new UI to learn and a user does not need to first review a user interface to make a selection using a chatbot. In contrast, in traditional web application, user interfaces are difficult. The user must find the app, sign in, learn the UI, review potentially hundreds of inputs on the screen before making a selection. With a chatbot, a user can take action within seconds without requiring a learning curve or confusion as to where to click.

However, today's chatbots have various issues that prevent use in providing dynamic conversational-based customer support. First, chatbots have limited memory or context to support a dynamic dialog. Typically, chatbots cannot hold contextual information for longer than a few chat bubbles, and lose the content of a conversation with a user before the user poses a complete set of questions. As shown in FIG. 16D, the user asks a chatbot for restaurant recommendations in San Francisco, but a few chat bubbles later, when the user requests a sushi restaurant, the chatbot no longer recalls the user's location as San Francisco. Second, chatbots must be configured with questions in a fixed order and with a set of fixed answers that cannot be changed based on prior answers. In order for the chatbot to skip certain questions requires the implementation of a substantial amount of code in the chatbot. Third, the chatbot lacks the functionality to personalize an implemented conversation based on different users. Fourth, configuring (populating) the content of the chatbot is manual, and, thus, for high complexity tasks very labor intensive. Fifth, the ability to manage web and chat contents for the same application requires two independent efforts.

Embodiments of the present invention improve a chatbot, thereby creating a knowledge bot that provides dynamic conversational-based customer support. This improved chatbot utilizes the functionality of the intelligent multimedia e-catalog (e.g., Knowledge Work as a service Platform) of the present invention, which enables the chatbot to have the intelligence of best experts to advise and make recommendations related to a particular product or application, as well as perform rules based administrative tasks. Further, the improved chatbots can keep context in a conversation with a user, including remembering prior parts of the conversation to use in downstream responses. As the conversation continues, the response (questions) by the chatbot may be dynamically determined (without reprogramming of code) by the intelligent multimedia e-catalog to keep context in the conversation with the user, rather than based on questions in a fixed order and with a set of fixed answers that are hard-coded into the chatbot. The response may also be dynamically determined (without implementation of code) by the intelligent multimedia e-catalog to provide different responses for different users. In addition, the infrastructure of embodiments of the intelligent multimedia e-catalog enables transferring customer (user) interaction between the improved chatbot and web-based customer support.

Figure 16A:
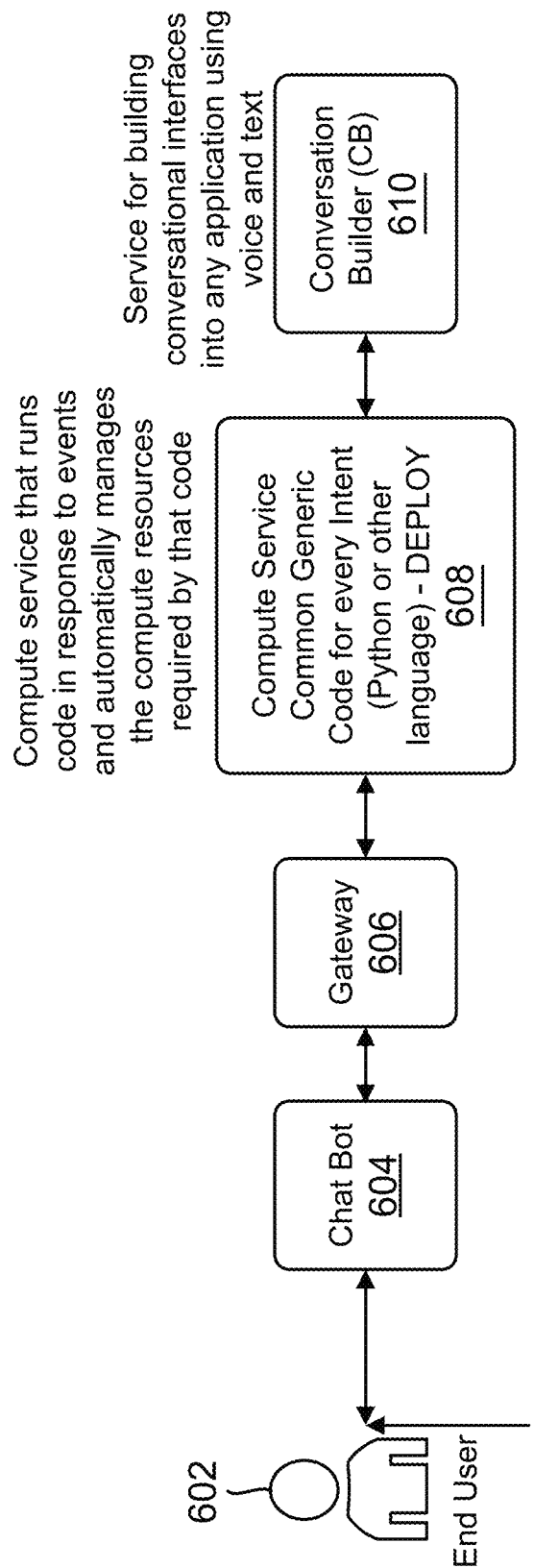

FIG. 16A illustrates the architecture of a traditional chatbot, which includes a chatbot conversational interface 604, a gateway 606, a computer service 608, and a conversation builder 610. An end user 605 interacts with the chatbot through the chatbot conversational interface 604, which transmits the interaction through the gateway 606 and the compute service 608 to a conversation builder 610. The conversation builder 610 is a service for building and processing conversations that are integrated into any application using voice and text. In particular, conversations are built by providing to the conversation builder 610 the types of conversations (intent) supported for a particular application, such as conversations to select a product from a vendor application. A particular type of conversation (intent) may be represented as a table of synonyms. The conversations are further built by providing to the conversation builder 610 the questions (slots) that a user must complete to conduct a particular type of conversation and any values for the questions (slot types). The slot types may be standard (non-custom), where the conversation builder 610 uses natural language processing to match a word of an interaction to an entry in the synonyms table to determine a slot type. The slot types may also be custom where a static list of legal values are provided for the slot.

When the to the conversation builder 610 receives an initial interaction of a user conversation, the conversation builder 610 uses natural language processing to match a conversation type (intent) and retrieve the series of questions (slots) that a user must complete for the conversation. The conversation builder 610 proceeds to transmit each retrieved question (slot) and values (slot types) to the user based on the response of the user to a previous question. The conversation builder 610 may also provide events to the compute service 608, and the compute service 608 runs common generic code (e.g., Python, Java, and such) in response to the events to take actions related to the slots. The compute service 608 may be implemented with code for each different conversation type (intent), questions (slocs), values (sloc types), and such. The compute service 608 also automatically manages the compute resources required by the code. The compute service 608 transmits each question from the conversation builder 610, via the gateway 606, to the chatbot conversation interface 604 for presentation and answer by the end user 602.

Figure 16B:
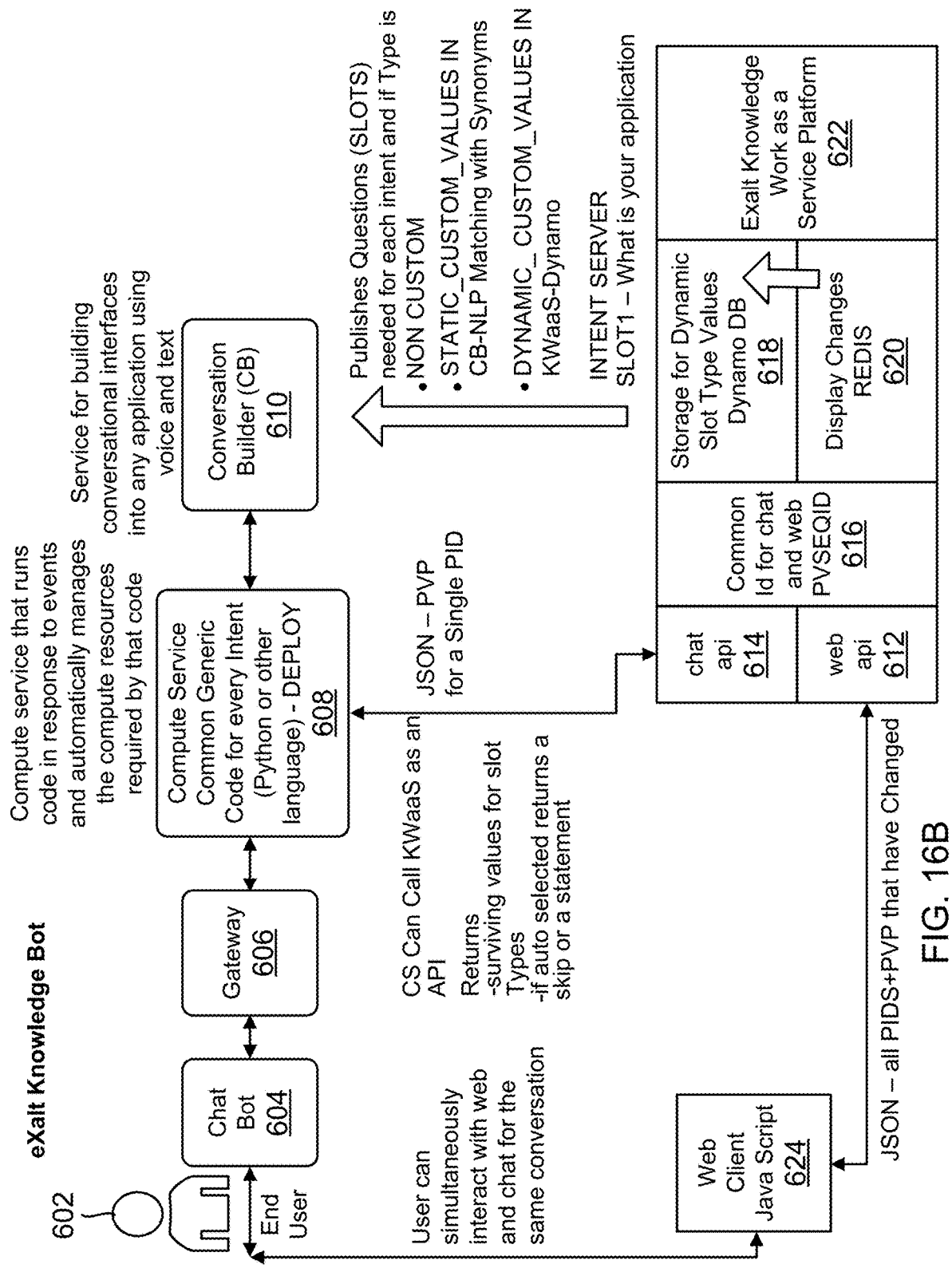

FIG. 16B illustrates integrating the intelligent multimedia e-catalog with the chatbot architecture to provide dynamic conversational-based customer support by an improved chatbot (knowledge bot). Unlike prior chatbot solutions that build a tree or stack to keep state of a user conversation, the intelligent multimedia e-catalogue tracks question-to-question interdependencies to keep state of the user conversion. As part of the integration, the intelligent multimedia e-catalog (e.g., Exalt Knowledge Work as a Service Platform (KWaaS) 622) builds the conversation builder 610 by publishing questions (slots) needed for each conversation type (intent) of an application and values (slot types) as appropriate. For example, the KWaaS 622 may publish questions related to product catalog options for a particular type of product solution and corresponding appropriate values for the product catalog options. For standard (NON CUSTOM) slot types and static custom (STATIC_CUSTOM_VALUE) slot types, the KWaas 622 configures natural language processing matching with synonyms. For dynamic custom (DYNAMIC_CUSTOM_VALUE) slot types, the KWaaS 622 configures a chat application programming interface (API) to be executed by the compute service 608 to call KWaaS 622.

The improved chatbot functions are similar to the traditional chatbot as described in FIG. 16A, except in the case of dynamic custom slot type values. In this case, the conversation builder 610 provides dynamic slot type events to the compute service 608, and the compute service 608 calls KWaaS 622 as an API 614 with the slot. Based on the slot, KWaaS 622 dynamically reconfigures/auto populates the application information (e.g., product information if the conversation is regarding a product of a vendor application). The KWaaS 622 further returns to the compute service 608, via the API 614, the surviving values for slot types for the application after the reconfiguration, or if automated selected (narrowed to one value) returns a skip or statement in place of the slot type. In the case of returning surviving values, the compute service 608 transmits the slot and the surviving slot type values, via the gateway 606, to the chatbot conversation interface 604 for presentation and answer by the end user 602. In the case of returning a skip or statement, the compute service 608 notifies the conversation builder 610 to proceed to the next slot (question). By the compute service 608 calling KWaaS 622 via API 614

(and the KWaaS 622 dynamically reconfiguring the application information), the compute service 608 need not implementation (i.e., not custom reprogram) code at the compute service 608 (or KWaaS) to attempt to provide similar functions.

Further, as part of the integration, KWaaS 622 generates an identifier (instance) 616 specific to the conversation with the end user 602. The identifier 616 may be used commonly to allow the user to simultaneously manage the content for web (e.g., as displayed parameters and parameter values) via the web API 612 and chat (e.g., as slots and slot types) via chat API 614 in the same conversation (or switch between the two based on which interface is better suited for a particular point in the conversation). For example, the web may be more suited when more detailed information is being provided on a product in a vendor application. In additional, the identifier may be used to identify different end users and dynamically reconfigure the information (e.g., product information) in a manner personalized to the current end user 602.

Figure 16C:
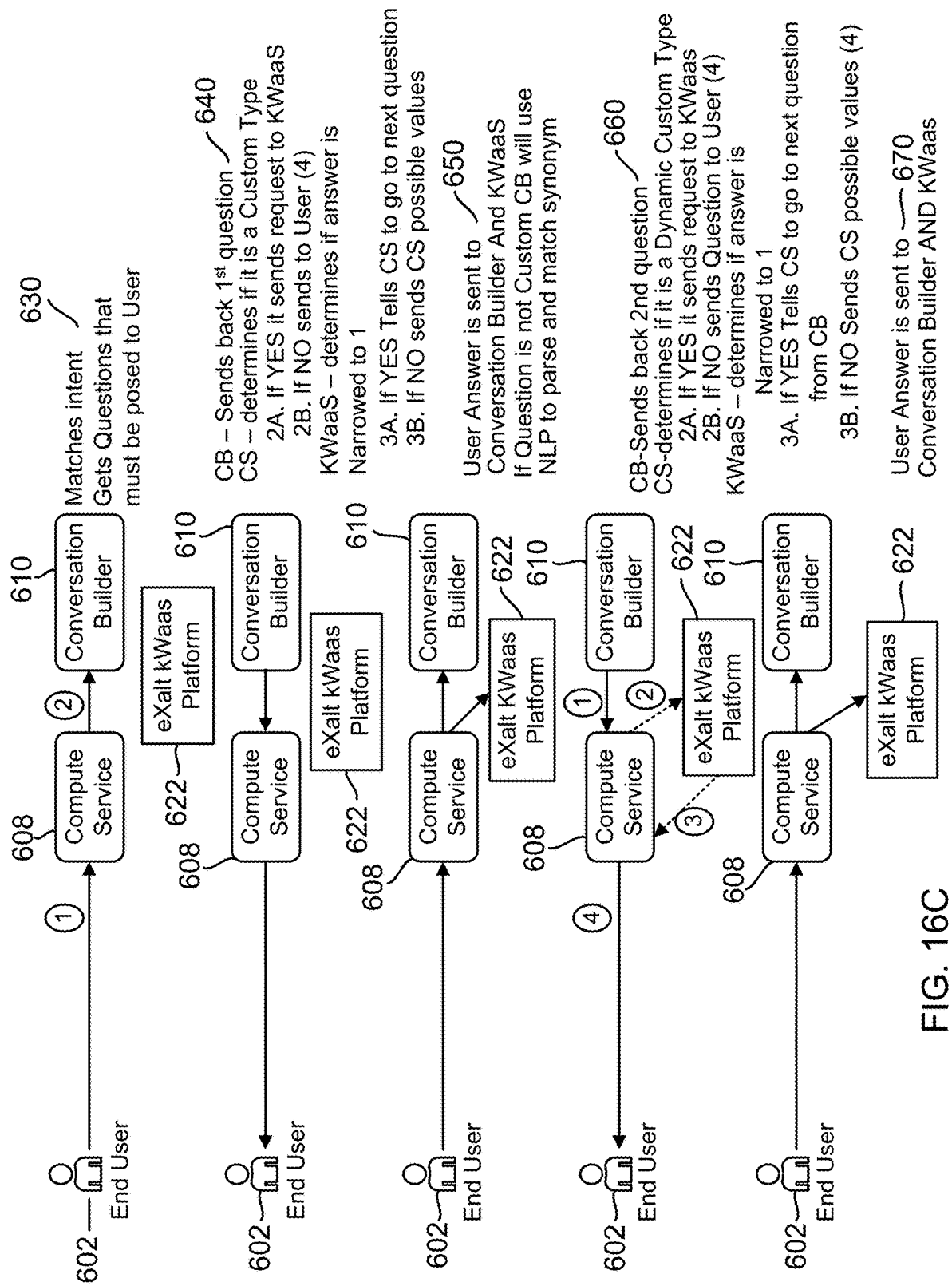
Figure 16D:
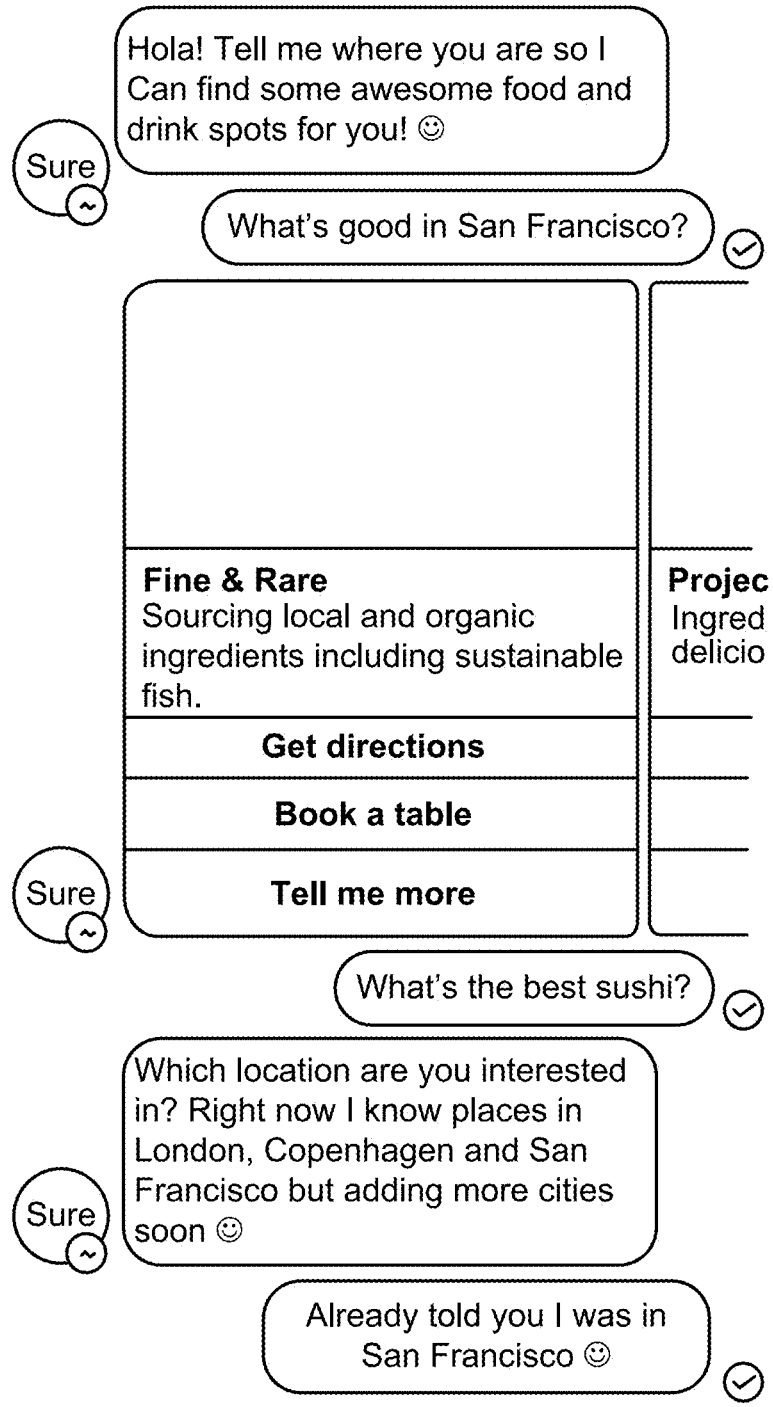

FIG. 16C illustrates sequence for performing an improved chatbot conversation for dynamic conversational-based customer support. The conversation sequence is described in reference to Example Interaction 1 of FIG. 16E.

The conversation sequence of FIG. 16C begins with the end user 602 initiating a conversation to purchase a server from a vendor application with the communication "I want to purchase a server" of FIG. 16E. The chatbot conversation interface transmits the communication, via the compute services 608, to the conversation builder 610. In FIG. 16C, the KWaaS 622 previously configured the conversation builder 610 by automatically publishing slots for different conversations (intents) related to products of a vendor application, including server products, and also published slot types (non-custom, static custom, and dynamic custom) for the published slots. At step 630, the conversation builder 610 uses natural language processing to parse the initial interaction ("I want to purchase a server") and match in a synonym table to determine the intent. Based on the intent, the conversation builder 610 retrieves the series of questions (slots) that must be posed to the user.

At step 640, the conversation builder 610 then sends back the first question of the series ("What application do you want to run" of FIG. 16E) with a non-custom slot type. The compute service 608 determines the slot type is not a dynamic custom type, and at substep 2B sends the first question to the user. Alternatively, if it was a dynamic custom type, the compute service 608 at substep 2B, via chat API 614, would have instead sent it to KWaaS 622. Then, KWaaS would have proceeded to dynamically reconfigure/populate the available server information based on the slot, and determine if the reconfiguration narrowed slot types to 1 answer. If yes, KWaaS at substep 2A, via chat API 614, would have communicated to the compute service 608 to go to next question. If yes, KWaaS at substep 2B, via chat API 614, would have communicated to the compute service 608 to send the returned slot types from the reconfiguration to the user 602 (via the chatbot conversational interface).

At step 650, the user 602 (via the chatbot conversational interface) then answers "Oracle Database" of FIG. 16E, which is transmitted to the compute service 608 (which further sends, via chat API 614, to the KWaaS for reconfiguring the available server information based on the answer. The answer is further transmitted to the conversation builder 610, which in response retrieves the $2^{nd}$ (slot) question ("How many virtual CPU's do you think you will require" of FIG. 4E, and further retrieves the static custom sloc types for this slot ("8, 16, or 32"). If the slot was not a custom slot type, then the conversation builder 610 would use natural language processing to parse and match synonyms. Then, step 660 proceeds similar to step 640 in sending back the $2^{nd}$ question to the user (without calling KWaaS as this is not a dynamic slot type).

At step 670 again, the user 602 (via the chatbot conversational interface) then answers "32" of FIG. 16E, which is transmitted to the compute service 608 (which further sends, via chat API 614, to the KWaaS for reconfiguring the available server information based on the answer. The answer is further transmitted to the conversation builder 610, which retrieves the $3^{rd}$ (slot) question on memory choices, which has a dynamic slot type. Then at step 660, the compute service 608 determines the slot type is a dynamic custom type, and at substep 2A, via chat API 614, sends the slot to KWaaS 622. Then, KWaaS 622 dynamically reconfigures the available server information based on the slot, and determines that the reconfiguration narrows the dynamic slot values to two ("8 GB" and "16 GB"). Thus, KWaaS at substep 2B, via chat API 614, communicates to the compute service 608 the two returned dynamic slot type values from the reconfiguration, and the compute service 608 sends the slot and slot type values to user 602 (via the chatbot conversational interface). The conversation with the chatbat proceeds in this manner until the user is returned a web link to details on a recommended solution, which may execute the website using the same identifier as the chat conversation to display the current configured server information from the KWaaS 622.

Interaction 2 of FIG. 16E illustrates another conversation performed based on the conversation sequence of FIG. 16C (via the improved chatbot).

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented conversation-based customer support system comprising:
   an application server configured to execute a conversational interface;
   the conversation interface configured to provide dynamic computer based conversational support in response to an input by transmitting at least one of values as a dynamic slot type event to a compute service computing system via an application programming interface (API);
   the compute service computing system configured to respond to the receipt of the dynamic slot type event by reconfiguring the gateway with a dynamic slot value corresponding to the dynamic slot type event and the input, such that the compute service computing system dynamically auto populates the application information programming interface (API) with the dynamic slot value providing product information from the intelligent product catalog system corresponding to the dynamic slot type event;
   the compute service computing system configured to respond to reconfiguring the gateway by transmitting via the application programing interface (API) the dynamic slot value to the conversation builder; and
   the application server configured to transmit via the conversational interface the dynamic slot value in answering the input.

2. The conversation-based customer support system of claim 1, further comprising:
the application server having at least one computer processor implementing a computational conversation-based customer support system via a gateway computing system by executing:
a conversation engine coupled to the conversational interface providing dynamic computer based conversational support, the conversation engine comprising: a conversation builder for building and processing conversations with a user based on intent, and a compute service computing system for performing actions in response to the processed conversations;
an intelligent product catalog system comprising configuration rules that determine valid configurations of product catalog options for product solutions, the intelligent product catalog system: (i) automatically publishes at the conversation builder different sets of inputs associated with the product catalog options, each set of published inputs associated with a different intent, and (ii) configures the compute service computing system with an application programming interface (API) to the intelligent product catalog system;
a conversation builder receiving interaction from a user deciding on a product solution, and based on matching the user interactions with a published intent, selecting and sending a published set of inputs to the user; and
for each sent input, the compute service computing system forwarding the input to the intelligent product catalog system to dynamically reconfigure product catalog options related to the input, the compute service computing system presenting to the user, the input and remaining product catalog options as values for answering the input.

3. The conversation-based customer support system of claim 2, further comprising:
for each answer by the user in response to a sent input, the compute service forwarding the answer to the intelligent product catalog system to dynamically reconfigure product catalog options related to the sent input.

4. The conversation-based customer support system of claim 2, wherein the configured interface from the compute service to the intelligent product catalog system is an application programming interface (API).

5. The conversation-based customer support system of claim 2, wherein the conversation builder executes natural language processing to parse and match synonyms to determine non-custom values associated with an input, in conjunction with forwarding the input to the intelligent product catalog system.

6. The conversation-based customer support system of claim 2, wherein the intelligent product catalog system automatically publishes a static list of values for at least one of the inputs, and the conversation builder sends the static list to the user with the input, in conjunction with forwarding the input to the intelligent product catalog system.

7. The conversation-based customer support system of claim 2, wherein if remaining product catalog options only include 1 option, the compute service communicates to the conversation builder to send a next published input of the series rather than presenting the option to the user.

8. The conversation-based customer support system of claim 2, further including a web application, the web application and conversation engine sharing a user identifier to enable the intelligent product catalog system to provide the product catalog options to the user in both the web application and conversation engine experience.

9. The conversation-based customer support system of claim 2, wherein the intelligent product catalog system uses the user identifier to dynamically reconfigure the product catalog options personalized to the user.

10. The conversation-based customer support system of claim 2, wherein the input values are dynamically determined without any custom reprogramming of code at the compute service or intelligent product catalog system.

11. The conversation-based customer support system of claim 2, wherein the intelligent product catalog system maintains context throughout the conversation with the user.

12. The conversation-based customer support system of claim 2 wherein the configuration rules provide for presenting only valid configurations of product option for the product solution.

13. The conversation-based customer support system of claim 1, wherein the configuration rules provide a budget-based configuration analysis such that only the addition of product options that are within a predefined limit are presented or permitted.

14. The conversation-based customer support system of claim 1, wherein the budget is based upon at least one of: dimensions, weight, temperature, power consumption, air flow and cost; and
wherein the configuration rules provide for presenting or permitting only options that do not conflict with other options already selected for the product solution.

15. The conversation-based customer support system of claim 1, further comprising a syndication and publishing system configured to syndicate at least a portion of the product catalog options from a first catalog with at least a portion of the product options from a second catalog to create syndicated catalogs defined according to the parametric database schema.

16. The conversation-based customer support system of claim 15, further comprising a content translator in communication with the syndication and publishing system, the content translator configured to convert unstructured content from the first and second catalogs into structured content using the parametric database schema to create at least a portion of the product catalog options of the syndicated catalogs.

17. The conversation-based customer support system of claim 1, further comprising a database repository storing product information according to an object model representing the product information, the object model including parametric objects, graphic objects, document objects, configuration business rules objects and procurement rule objects; and
wherein the database uses a metadata system describing the product information, the metadata system dynamically reconfiguring user applications when new product types are added to the database.

18. The conversation-based customer support system of claim 17, wherein:
the configuration rules being stored according to a hierarchy by:
storing information on sub-products that a product is comprised of, including storing product part replacement information;
storing product accessories that can be added to a product;
storing rules for the product solution that incorporates product information stored in the database; or
storing rules for equivalence or substitution of products for use when building a product solution.

19. The conversation-based customer support system of claim 1 further comprising enabling the user to answer the inputs in any order; and
   wherein new configuration rules are added without reprogramming the object model.

20. A computer implemented conversation-based customer support method comprising:
   providing dynamic computer based conversational support via a conversation builder in response to an input by transmitting at least one of values as a dynamic slot type event to a compute service computing system via an application programming interface (API);
   configuring the compute service computing system to respond to the receipt of the dynamic slot type event by reconfiguring the gateway with a dynamic slot value corresponding to the dynamic slot type event and the input, such that the compute service computing system dynamically auto populates the application information programming interface (API) with the dynamic slot value providing product information from the intelligent product catalog system corresponding to the dynamic slot type event;
   configuring the compute service computing system to respond to reconfiguring the gateway by transmitting via the application programing interface (API) the dynamic slot value to the conversation builder; and
   transmitting via the conversational interface the dynamic slot value in answering the input.

21. A computer implemented conversation-based customer support system comprising:
   means for providing dynamic computer based conversational support via a conversation builder in response to an input by transmitting at least one of values as a dynamic slot type event to a compute service computing system via an application programming interface (API);
   means for configuring the compute service computing system to respond to the receipt of the dynamic slot type event by reconfiguring the gateway with a dynamic slot value corresponding to the dynamic slot type event and the input, such that the compute service computing system dynamically auto populates the application information programming interface (API) with the dynamic slot value providing product information from the intelligent product catalog system corresponding to the dynamic slot type event;
   means for configuring the compute service computing system to respond to reconfiguring the gateway by transmitting via the application programing interface (API) the dynamic slot value to the conversation builder; and
   means for transmitting via the conversational interface the dynamic slot value in answering the input.

* * * * *